(12) United States Patent
Tajima et al.

(10) Patent No.: US 9,262,184 B2
(45) Date of Patent: Feb. 16, 2016

(54) VIRTUAL COMPUTER SYSTEM AND I/O IMPLEMENTING METHOD IN VIRTUAL COMPUTER

(71) Applicant: Hitachi, Ltd., Tokyo (JP)

(72) Inventors: Sachie Tajima, Tokyo (JP); Hitoshi Ueno, Tokyo (JP)

(73) Assignee: HITACHI, LTD., Tokyo (JP)

( * ) Notice: Subject to any disclaimer, the term of this patent is extended or adjusted under 35 U.S.C. 154(b) by 119 days.

(21) Appl. No.: 14/254,581

(22) Filed: Apr. 16, 2014

(65) Prior Publication Data

US 2014/0317619 A1 Oct. 23, 2014

(30) Foreign Application Priority Data

Apr. 18, 2013 (JP) ................. 2013-087040

(51) Int. Cl.
*G06F 9/455* (2006.01)
*G06F 3/00* (2006.01)

(52) U.S. Cl.
CPC ..................... *G06F 9/455* (2013.01)

(58) Field of Classification Search
None
See application file for complete search history.

(56) References Cited

U.S. PATENT DOCUMENTS

2009/0007112 A1  1/2009  Moriki et al.

FOREIGN PATENT DOCUMENTS

JP    2009-003749 A    1/2009

*Primary Examiner* — Adam Lee
(74) *Attorney, Agent, or Firm* — Volpe and Koenig, P.C.

(57) ABSTRACT

An OS on a virtual computer at the (n+m)-th stage (n and m represent natural numbers) is caused to recognize a device driver that runs on an OS on the n-th stage virtual computer. Specifically, a shared region is generated in a memory, and the OS at the second stage is caused to recognize, in a pass-through manner, the device driver that runs on the OS at the second stage.

4 Claims, 22 Drawing Sheets

FIG. 22

| 1st OS ADDRESS (2201) | GUEST NAME (2202) | GUEST ADDRESS (2203) |
|---|---|---|
| 0512 | GUEST 1 | 0256 |
| 2345 | GUEST 2 | 0001 |

ADDRESS CONVERSION INFORMATION B 511

VIRTUAL COMPUTER SYSTEM AND I/O IMPLEMENTING METHOD IN VIRTUAL COMPUTER

CROSS-REFERENCE TO RELATED APPLICATIONS

This application claims the priority of Japanese Patent Application No. 2013-087040, filed on Apr. 18, 2013, which is incorporated herein by reference in its entirety.

BACKGROUND OF THE INVENTION

1. Field of the Invention

The present invention relates to input/output (I/O) that is implemented by an uppermost computer environment in environments having virtualization mechanisms overlaid at plural stages.

2. Description of the Related Art

One example of the related art in the field of the present invention is disclosed in JP-2009-003749-A. This publication discloses that "by selecting either one of a guest status area 221 for executing a user program on a second virtual processor in accordance with a factor of calling a host virtual machine manager (VMM) and a host status area 222 for executing a guest VMM, and updating a guest status area 131 for controlling a physical processor in a shadow virtual machine control block (VMCB), a next generation operating system (OS) having a virtualization function is executed as the user program on a first virtual processor".

JP-2009-003749-A describes a means that causes an OS having a virtualization mechanism to operate, on a virtual computer formed with a virtualization technology, on a physical computer, or so-called "multistage virtualization technology". By using multistage virtualization technology, an environment that includes virtual computers at plural stages can be constructed.

The multistage virtual computer environment has an advantage in that a flexible system configuration can be set up. Conversely, the multistage virtual computer environment has a problem in that deterioration in performance is likely to occur because in order for a virtual computer at an uppermost stage to access a virtual computer at a lowermost stage, the accessing needs to be established via a virtual computer and virtualization mechanism at an intermediate stage.

For example, it is assumed that in a two-staged virtual computer environment, an I/O request is issued from an OS on a virtual computer at the second stage to a physical device. The I/O request executed on the virtual computer at the second stage is received by an OS on a virtual computer at the first stage. The OS on the virtual computer at the first stage executes the received I/O request. This I/O request is received by a virtualization mechanism on a physical computer. The virtualization mechanism issues an I/O request to the physical device.

This example indicates that "the I/O request executed on the virtual computer at the second stage is executed via two layers of the virtualization mechanism on the physical computer". This indicates that performance of the I/O request executed by the OS on the virtual computer at the second stage deteriorates than performance of the I/O request executed by the OS on the physical computer and the virtual computer at the first stage.

SUMMARY OF THE INVENTION

To this end, according to an aspect of the present invention, there is provided a virtual computer system including: a physical computer including a central processing unit (CPU) and a physical memory; a first virtualization mechanism that operates on the physical computer to provide a first virtual computer; a second virtualization mechanism that, operates on the first virtual computer to provide a second virtual computer; and a device connected to the physical computer.

A self driver generator in a driver generating mechanism I included in the first virtual computer loads a driver I allocated to the first virtual computer into a first virtual memory allocated to the first virtual computer. The driver generating mechanism I may store, as controller information, an identifier of the device which is allocated to the first virtual computer. The driver generating mechanism I may generate a shared region I in a region of the first virtual memory into which the driver I is loaded. The driver generating mechanism I may store an identifier of the device which is allocated to the first virtual computer and an address of the shared region I in address management information correspondingly to the driver I. The driver generating mechanism I may transmit the address management information to the first virtualization mechanism. A driver generating mechanism A included in the first virtualization mechanism may acquire an identifier of the device which is allocated to the first virtual computer corresponding to the loading driver by referring to the address management information received from the driver generating mechanism I. The driver generating mechanism A may convert the identifier of the device which is allocated to the acquired first virtual computer to an identifier of the device which is recognizable by the first virtualization mechanism. The driver generating mechanism A may load, into the physical memory, a driver A of the device which corresponds to the identifier of the device which is recognizable by the first virtualization mechanism. The driver generating mechanism A may acquire an address of the shared region I which corresponds to the identifier of the device, to which the first virtual computer is allocated by referring to the received address management information. The driver generating mechanism A may convert the acquired address of the shared region I to an address of a shared region A which is recognizable by the first virtualization mechanism. The driver generating mechanism A may generate a shared region A whose address has been converted to an address recognizable by the first virtualization mechanism in a region I of the physical memory in which the driver A is loaded. A guest driver generator I 432 of the driver generating mechanism I may search for the address management information by using the identifier stored in the controller information. When an identifier included in the address management information and the identifier stored in the controller information are identical to each other, the guest generator I 432 may acquire an address of the shared region I which corresponds to the identical identifiers. The guest generator I 432 may convert the acquired address of the shared region I to an address of a shared region II which is recognizable by the second virtual computer. The guest generator I 432 may transmit the address of the shared region II to the second virtual computer. The second virtual computer may use, as a driver II of the second virtual computer, a driver of the device, which corresponds to an interruption received from the first virtual computer. The second virtual computer may store, in the driver II, the address of the shared region II which is received from the driver generating mechanism I. A driver II of the second virtual computer may receive an I/O executing request of the second virtual computer. The driver II of the second virtual computer may store the received I/O executing request in the shared region II. The first virtualization mechanism may refer to the shared region A, which corresponds to the shared region II, by storing the I/O executing request in the shared region II. The first virtualization mechanism may execute the I/O executing request for the device which is allocated to the first virtual computer. The first virtualization mechanism may transmit completion of executing the I/O executing request to the driver I. The driver I of the first virtual computer may transmit the completion of executing the I/O executing request which is received from the first virtualization mechanism, to the driver II. The driver II of the second virtual computer may receive the completion of executing the I/O executing request from the driver I.

According to an aspect of the present invention, the OS at the second stage is caused to recognize, in a pass-through manner, the device driver that runs on the OS at the second stage. This reduces I/O processing on the OS at the first stage, which has occurred in the two-staged virtualization mechanism of the related art, whereby deterioration in I/O performance is suppressed.

Specifically, a buffer for use in notifying the VMM of an I/O request when the OS at the first stage executes the I/O request is caused to be usable by the OS at the second stage. In addition, also a mechanism that sends a notification of executing an I/O request in use by the first OS is provided to the OS at the second stage. The OS at the second stage is able to execute the I/O processing almost without requiring processing on the OS at the first stage by using the buffer and the notifying mechanism.

In other words, an OS on a virtual computer at the (n+m)-th stage (n and m represent natural numbers) is caused to recognize a device driver that runs on an OS on the n-th stage virtual computer. This reduces I/O processing which has been executed in each of virtual computer layers in a multistage virtualization mechanism in the related art, whereby deterioration in I/O performance of the OS on the virtual computer at the (n+m)-th stage is suppressed.

BRIEF DESCRIPTION OF THE DRAWINGS

FIG. 22 is a table of the address conversion information B illustrated in FIG. 5.

DESCRIPTION OF THE PREFERRED EMBODIMENTS

Figure 1:
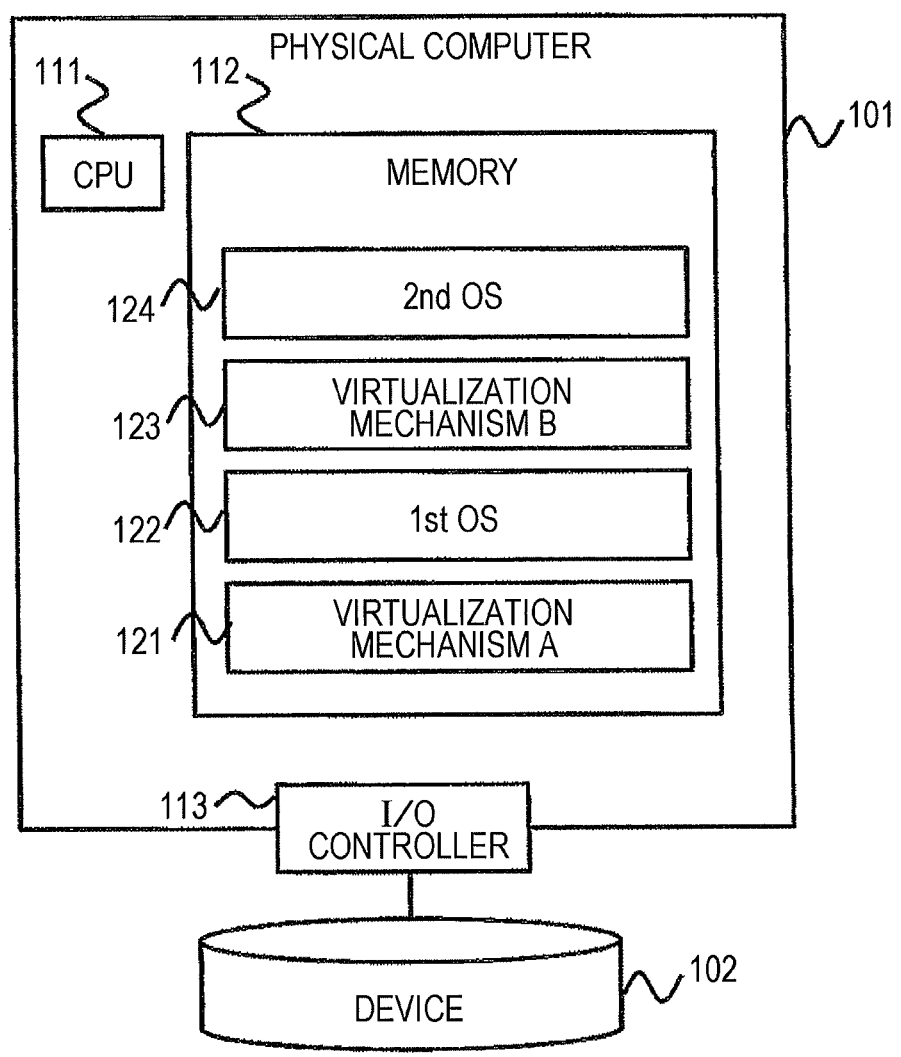
FIG. 1 is a device configuration diagram illustrating an example of an environment to which the present invention is applicable.

FIG. 1 illustrates an entire configuration of a computer system.

The computer system includes a physical computer 101 and a device 102 connected to the physical computer 101.

The physical computer 101 includes a CPU ill, a physical memory 112, and an I/O controller 113. The number of the CPUs 111 may be plural without being limited to one. The physical memory 112 includes a virtualization mechanism A 121, a 1st OS 122, a virtualization mechanism B 123, and a 2nd OS 124.

A virtualization mechanism A 121 runs on the physical computer 101. The virtualization mechanism A 121 generates a first virtual computer environment in which logical resources formed by logically dividing physical resources, such as the CPU 111 of the physical computer 101, are allocated. The 1st OS 122 runs on the generated first virtual computer.

Further, a virtualization mechanism B 123 runs on the virtual computer on which the 1st OS 122 runs. The virtualization mechanism B 123 generates a second virtual computer environment in which logical resources formed by logically dividing resources, such as a CPU, recognized by the virtualization mechanism B 123, are allocated. The 2nd OS 124 runs on the generated second virtual computer.

Note that although an embodiment of the present invention describes a two-staged virtual computer environment, the embodiment may be directed to a virtual computer environment having more than two stages. In addition, although in the embodiment, one virtual computer is generated on the virtualization mechanism A 121 and the 1st OS 122 runs on the one virtual computer, plural virtual computers may be generated on the virtualization mechanism A 121, and the 1st OS 122 may run on each virtual computer. Further, although one virtual computer is generated on the virtualization mechanism B 123 and the 2nd OS 124 runs on the virtual computer, plural virtual computers may be generated on the virtualization mechanism B 123 and the 2nd OS 124 may run on the each virtual computer.

Figure 2:
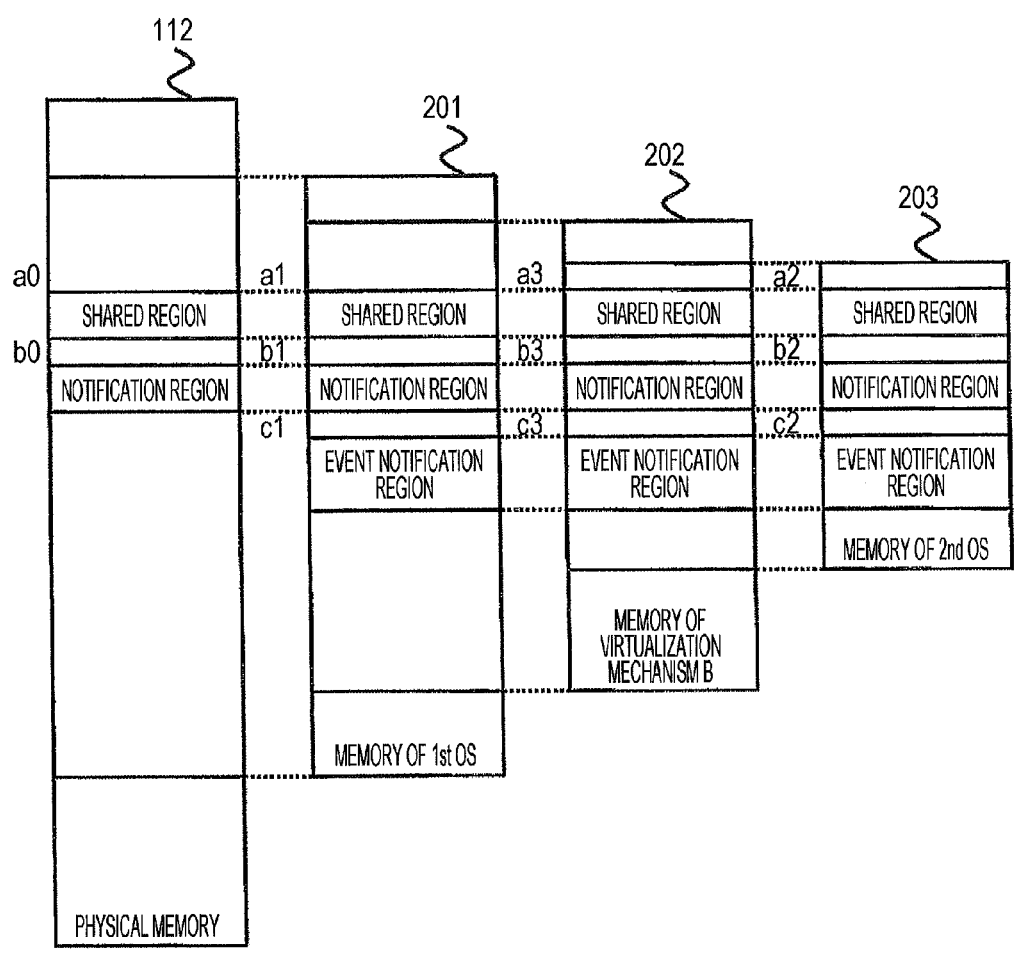
FIG. 2 is a memory configuration diagram of the device configuration illustrated in FIG. 1.

FIG. 2 illustrates allocation of memories to virtualization mechanisms and OSs.

The physical computer 101 includes the physical memory 112. The virtualization mechanism A 121 recognizes the physical memory 112, and allocates part of the physical memory 112 as a virtual memory 201 to a virtual computer. The 1st OS 122 that runs on the virtual computer recognizes the virtual memory 201.

The virtualization mechanism B 123 runs on the 1st OS 122. The 1st OS 122 permits an operation performed by the virtualization mechanism B 123 by using, as a virtual memory 202, part of the virtual memory 201 which is recognized by the 1st OS 122.

The virtualization mechanism B 123 allocates, as a virtual memory 203, part of the virtual memory 202, whose operation is permitted, to the virtual computer. The 2nd OS 124 that runs on the virtual computer recognizes the virtual memory 202.

The virtual memory 203 recognized by the 2nd OS 124 is included in the physical memory 112 recognized by the virtualization mechanism A 121. The 2nd OS 124 accesses the recognized virtual memory 203 by using address a3 recognized ty the 2nd OS 124. Here, an address that is used by the 2nd OS 124 is a value obtained such that each of the virtualization mechanism A 121 and the virtualization mechanism B 123 performs address conversion, and differs from the value of address a0 in the physical memory 112 recognized by the virtualization mechanism A 121. Accordingly, if the 2nd OS 124 uses the address recognized by it when accessing the physical memory 112, it cannot access the physical memory 112 as intended by it.

In this embodiment, the virtualization mechanism A 121 is notified of address a1 of a shared region reserved in the virtual memory 201 recognized by the 1st OS 122 and the size of the shared region. The virtualization mechanism A 121 performs address conversion to convert address a1 recognized by the 1st OS 122 to address a0 recognized by the virtualization mechanism A 121. The 1st OS 122 uses address a1, and the size of the shared region of which the virtualization mechanism A 121 is notified. The virtualization mechanism A 121 uses address a0, and the size of the shared region of which the virtualization mechanism A 121 is notified by the 1st OS 122. This enables both virtual mechanisms to access the shared region.

In addition, the 1st OS 122 also notifies the 2nd OS 124 of an address of the shared region and the size of the shared region. At this time, the 1st OS 122 notifies the 2nd OS 124 of not address a1 of the shared region recognized by the 1st OS 122 but address a3 of the shared region recognized by the 2nd OS 124.

As described above, the 1st OS 122, the virtualization mechanism A 121, and the 2nd OS 124 use addresses a1, a0, and a3, respectively, whereby they all are able to access the shared region.

A similar manner reserves a notification region capable of being accessed by the virtualization mechanism A 121, the 1st OS 122, and the 2nd OS 124. The 1st OS 122, the virtualization mechanism A 121, and the 2nd OS 124 use addresses b1, b0, and b3, respectively, whereby they all can access the notification region.

The similar manner reserves an event notification region capable of being accessed by the 1st OS 122 and the 2nd OS 124. The 1st OS 122 and the 2nd OS 124 use addresses c1 and c2, respectively, whereby both mechanisms can access the event notification region.

The above-described method can set the shared region capable of being accessed by the 2nd OS 124, the 1st OS 122, and the virtualization mechanism A 121. In addition, use of the shared region enables data communication between the 2nd OS 124 and the virtualization mechanism A 121 not via the 1st OS 122 and the virtualization mechanism B 123.

Figure 3:
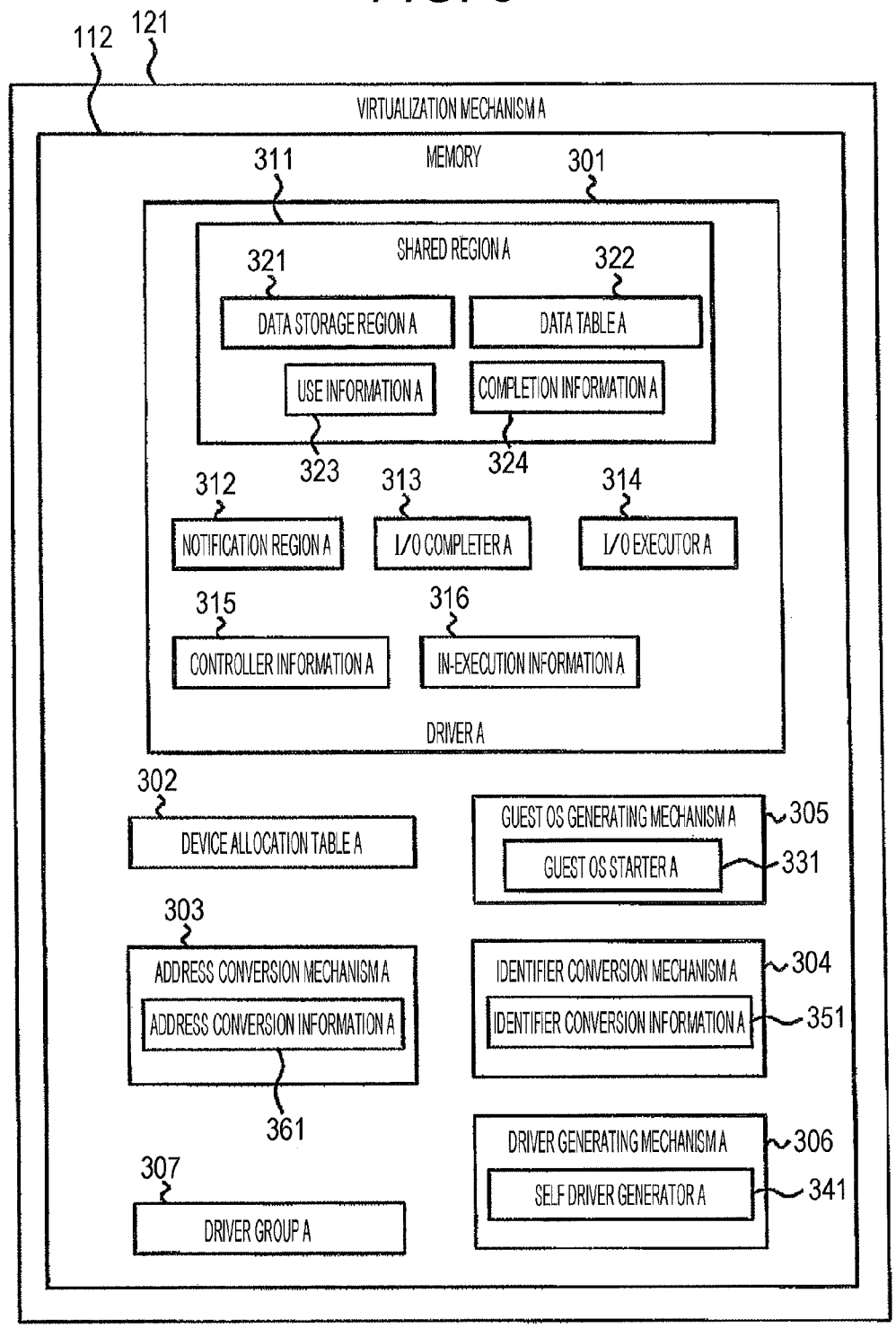
FIG. 3 is a configuration diagram of a virtualization mechanism A illustrated in FIG. 1.

FIG. 3 illustrates the configuration of the virtualization mechanism A 121.

The physical memory 112 is allocated to the virtualization mechanism A 121. The physical memory 112 stores a driver A 301, a device allocation table A 302, an address conversion mechanism A 303, an identifier conversion mechanism A 304, a guest OS generating mechanism A 305, a driver generating mechanism A 306, and a driver group A 307.

The driver A 301 includes a shared region A 311, a notification region A 312, an I/O completer A 313, an I/O executor A 314, controller information A 315, and in-execution information A 316.

The shared region A 311 includes the data storage region A 321, the data table A 322, use information A 323, and completion information A 324. The data table A 322, the use information A 323, and the completion information A 324 are fixed in size. At the time the shared region A 311 is reserved, the regions of the data storage region A 321, the addresses of the data table A 322, the use information A 323, and the completion information A 324 are determined.

The address conversion mechanism A 303 contains address conversion information A 361.

The identifier conversion mechanism A 304 contains identifier conversion information A 351.

The guest OS generating mechanism A 305 includes a guest operating system starter A 331.

The driver generating mechanism A 306 includes a self driver generator A 341.

Figure 4:
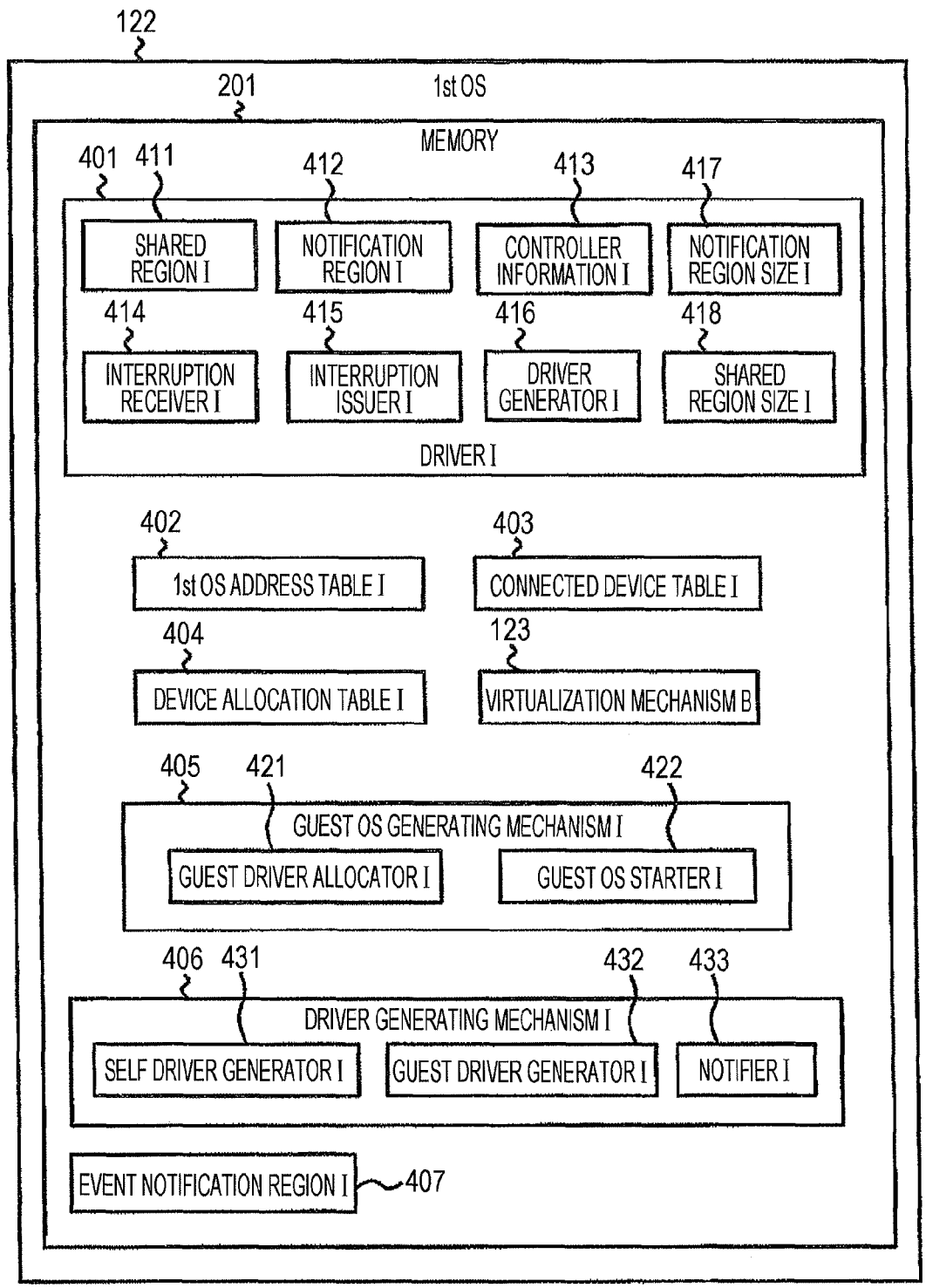
FIG. 4 is a configuration diagram of first (1st) OS illustrated in FIG. 1.

FIG. 4 illustrates the configuration of the 1st OS 122.

The 1st OS 122 includes the virtual memory 201. The virtual memory 201 stores the virtualization mechanism B 123, a driver I 401, a 1st OS address table I 402, connected device table I 403, device allocation table I 404, a guest operating system (OS) generating mechanism I 405, a driver generating mechanism I 406, and an event notification region I 407.

The driver I 401 includes a shared region I 411, a notification region I 412, controller information I 413, an interruption receiver I 414, an interruption issuer I 415, a driver generator I 416, a notification region size I 417, and a shared region size I 418.

The shared region I 411 is a region that starts at address a1 of the virtual memory 201 illustrated in FIG. 2. This region is identical to the shared region A 311, which starts at address a0 of the physical memory 112 illustrated in FIG. 2.

The notification region I 412 is a region that starts at address b1 of the virtual memory 201 in the virtual memory 201 illustrated in FIG. 2. This region is identical to the notification region A 312, which starts at address b0 of the physical memory 112 illustrated in FIG. 2. The notification region size I 417 and the shared region size I 418 store the size of the Notification region I 412 and the size of the shared region size I 411, respectively. Although this embodiment assumes that values are stored beforehand in the notification region size I 417 and the shared region size 418, the values are changeable by a user.

The guest OS generating mechanism I 405 includes a guest driver allocator I 421 and a guest OS starter I 422.

The driver generating mechanism I 406 includes self driver generator I 431, a guest driver generator I 432, and a notifier I 433.

Figure 5:
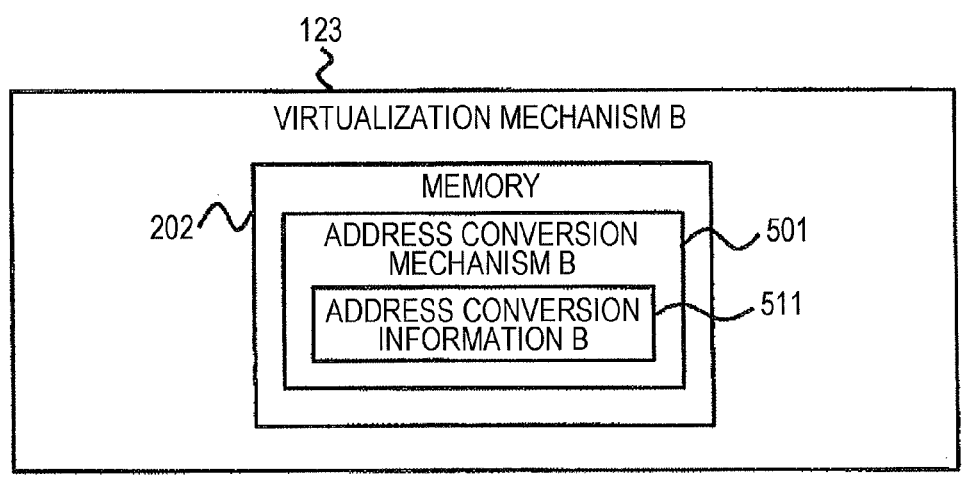
FIG. 5 is a configuration diagram of a virtualization mechanism B illustrated in FIG. 1.

FIG. 5 illustrates the configuration of the virtualization mechanism B 123.

The virtualization mechanism B 123 includes the virtual memory 202. The virtual memory 202 stores an address conversion mechanism B 501. The address conversion mechanism B 501 contains address conversion information B 511.

Figure 6:
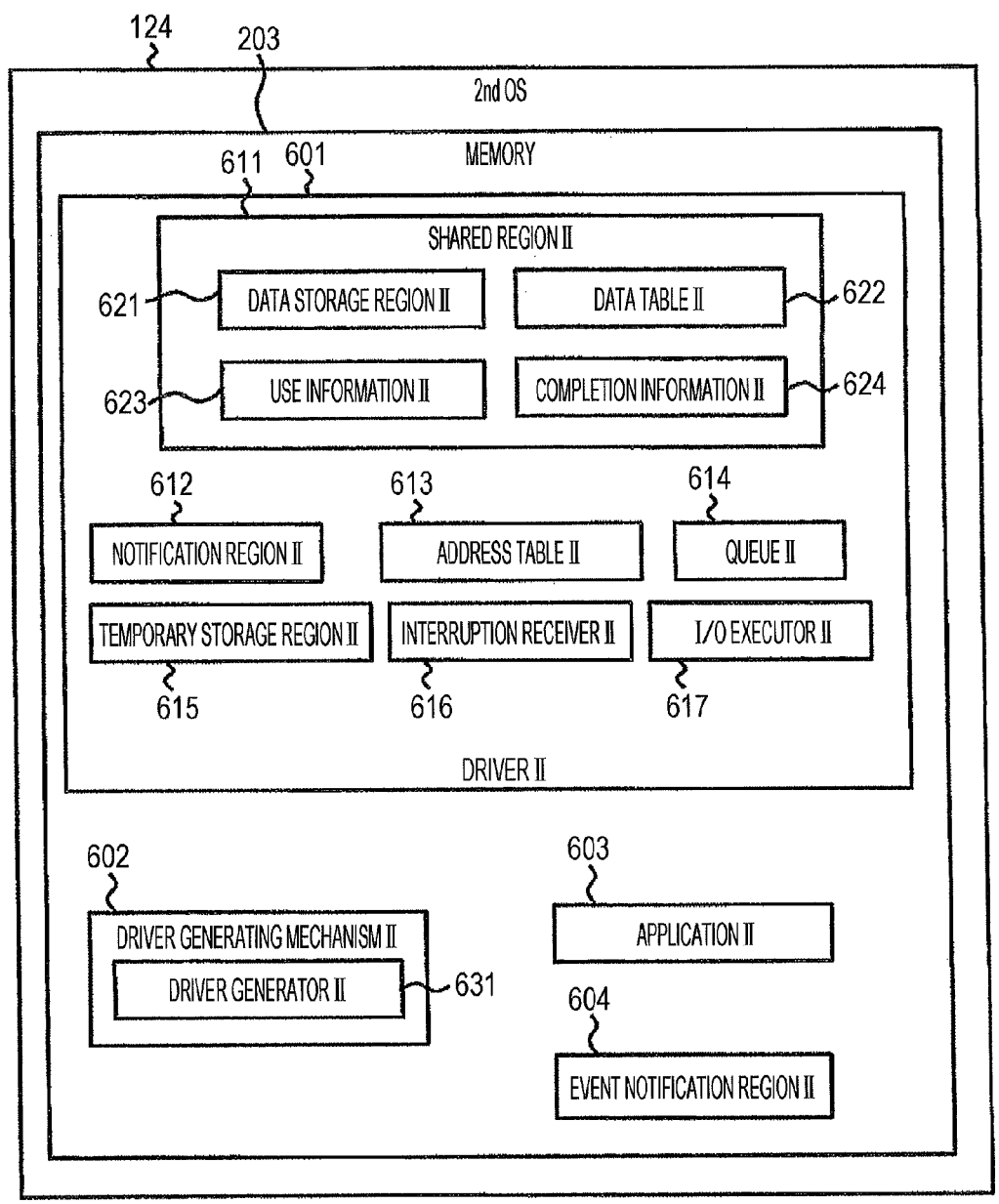
FIG. 6 is a configuration diagram of second (2nd) OS illustrated in FIG. 1.

FIG. 6 illustrates the configuration of the 2nd OS 124.

The 2nd OS 124 includes the virtual memory 203. The virtual memory 203 stores a driver II 601, a driver generating mechanism II 602, an application II 603, and an event notification region II 604.

The event notification region II 604 is a region that starts at address c2 of the virtual memory 203 in the 2nd OS 124 in FIG. 2. This region is the event notification region I 407, which starts at address c1 of the virtual memory 201 in the 1st OS 122 illustrated in FIG. 2.

The driver II 601 includes a shared region II 611, a notification region II 612, an address table II 613, a queue II 614, a temporary storage region II 615, an interruption receiver II 616, and an I/O executor II 617.

The shared region II 611 is a region that starts at address a2 of the virtual memory 203 in the 2nd OS 124 illustrated in FIG. 2. This region is identical to the shared region I 411, which starts at address a1 of the virtual memory 201 of 1st OS 122 in FIG. 2, and the shared region A 311, which starts at address a0 of the physical memory 112 illustrated in FIG. 2.

The notification region II 612 is a region that starts at address b2 in the virtual memory 203 of the 2nd OS 124 in FIG. 2. This region is identical to the notification region I 412 that starts at address b1 in the virtual memory 201 of the 1st OS 122 in FIG. 2, and the notification region A 312 that starts at address b0 in the physical memory 112 in FIG. 2.

The shared region II 611 includes a data storage region II 621, a data table II 622, use information II 623, and completion information II 624. The data table II 622, the use information II 623, and the completion information II 624 are fixed in size. At the time the shared region II 611 is reserved, the addresses of the data storage region II 621, the data table II 622, the use information II 623, and the completion information II 624 are determined. The driver generating mechanism II 602 includes a driver generator II 631.

Figure 7:
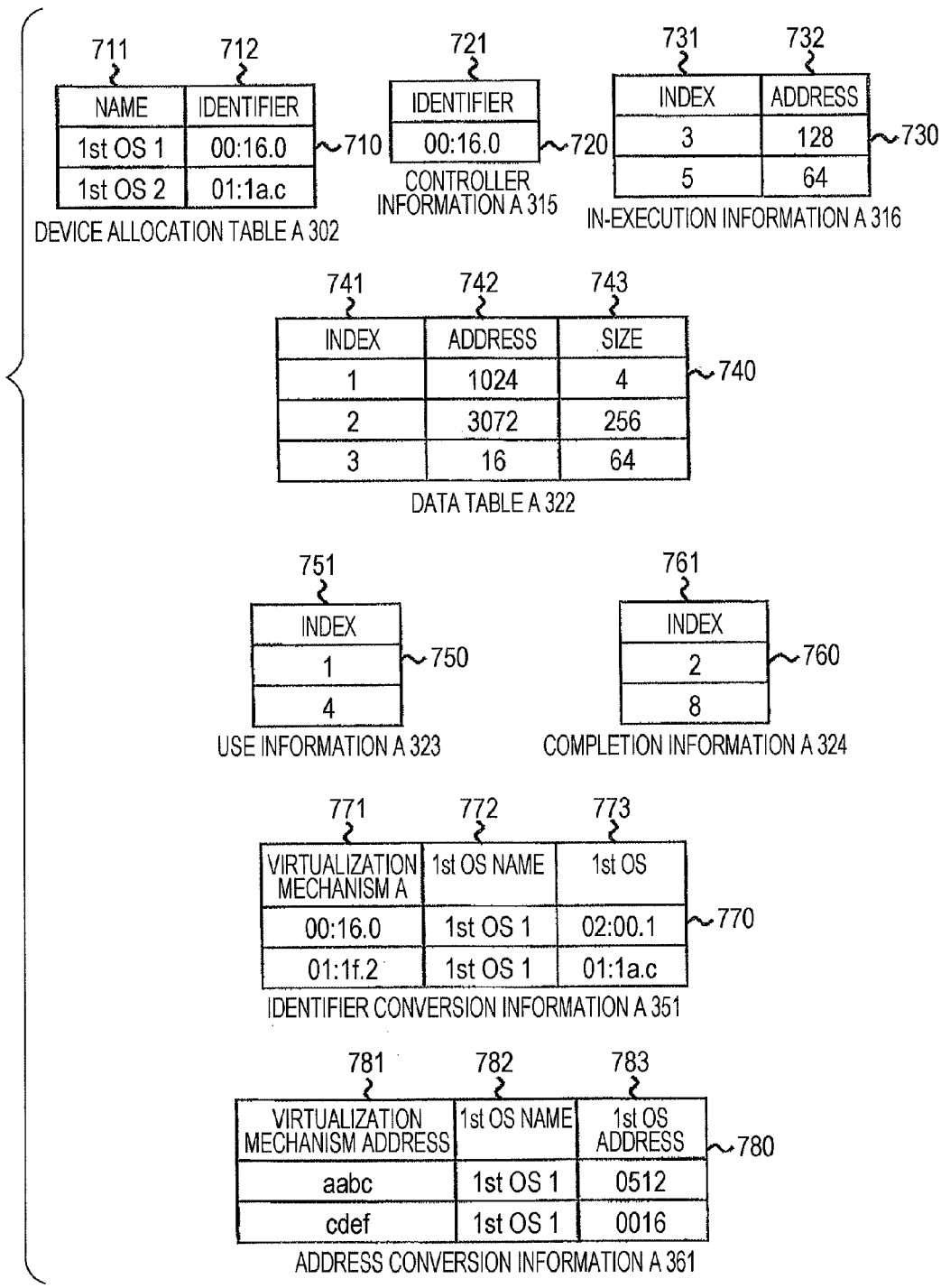
FIG. 7 illustrates examples of device allocation table A, control information A, in-execution information A, a data table A, use information A, completion information A, identifier conversion information A, and address conversion information A that are illustrated in FIG. 3.

FIG. 7 illustrates the device allocation table A 302, the controller information A 315, the in-execution information A 316, the data table A 322, the use information A 323, the completion information A 324, the identifier conversion information A 351, and the address conversion information A 361.

The device allocation table A 302 stores a name 711 that identifies a virtual computer to which a device is to be allocated, an identifier 712 that identifies the device to be allocated to the virtual computer identified by the name 711. For instance, a row 710 shows that a device identified by the identifier "00:16.0" is allocated to the virtual computer identified by the name "1st OS I". These pieces of information are specified and stored by, for example, the user.

The controller information A 315 stores an identifier 721 that identifies a device to which the driver A 311, which contains the controller information A 315, corresponds. For instance, a row 720 shows that the driver A 301, which contains the controller information A 315, corresponds to a device identified by the identifier "00:16.0".

The in-execution information A 316 stores an index 731 which identifies an I/O request being issued and which is stored in the data table A 322, and an address 732 of the device 102, which is identified and which is issuing the I/O request. For instance, a row 730 shows that in a row identified by the index "3" of the data table A 322, an I/O request identified from stored information is being issued at the address "128" of the device 102.

The data table A 322 stores the in-execution information A 316, the use information A 323, an index 741 that is used for identifying a row in the data table A 322 by the completion information A 324 or the like, an address 742 storing an I/O request, and a size 743 of the I/O request. For instance, a row 740 is identified by index "1" in the data table A 322. This row shows that the I/O request is stored in a region that starts at address 1024 of the data storing region A 321 having size "4".

The use information A 323 stores an index 751 which is stored in the use information A 323 and which identifies an I/O request that has not been issued. For instance, row 750 shows that I/O information stored in the row identified by the index "1" of the data table A 322 has not been issued yet for the device 102.

The completion information A 324 stores an index 761 which is stored in the data table A 322 and which identifies an I/O request awaiting receipt of the 2nd OS 124. For instance, a row 760 shows that I/O information identified by information stored in the index "2" of the data table A 322 has not been received yet by the 2nd OS 124.

The address conversion information A 361 includes a virtualization mechanism address 781 that is recognized by the virtualization mechanism A 121, a 1st OS name 782 that identifies a virtual computer to which a memory identified by the virtualization mechanism address 781 is allocated, and a 1st operating system (OS) address 783 that is a converted address of the virtualization mechanism address 781, which is identified by the virtual computer identified by the 1st OS name 782. For instance, a row 780 shows that a memory indicated by an address recognized as "aabc" by the virtualization mechanism A 121 is recognized as a memory that can be accessed by the address "0000".

By using the address conversion information A 361, the address "a0" of the shared region A recognized by the virtualization mechanism A 121 and the address "a1" of the shared region I recognized by 1st OS can be converted. In addition, the address "b0" of the notification region A identified by the virtualization mechanism A 121 and the address "b1" of the notification region I recognized by 1st OS can be converted.

In this embodiment, by using the 1st OS name 782, the address conversion information A has address conversion information of plural virtual computers in a table. By retaining plural pieces of address conversion information A, each virtual computer may retain address conversion information without using the 1st OS name 782.

Figure 8:
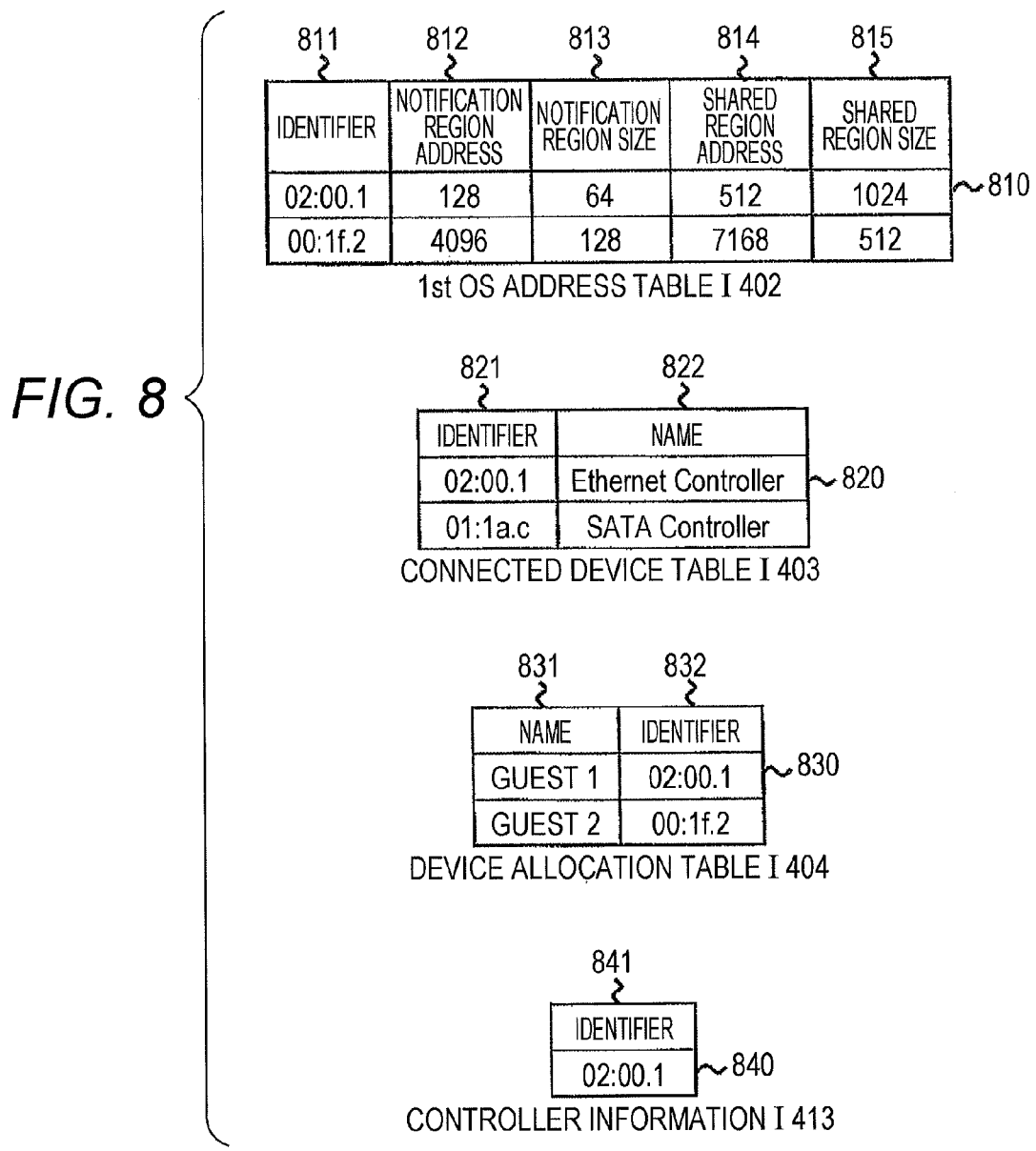
FIG. 8 illustrates examples of the 1st OS address table I illustrated in FIG. 4, a connected device table I, device allocation table I, and controller information I.

FIG. 8 illustrates a 1st OS address table I 402, connected device table I 403, device allocation table I 404, and controller information I 413.

The 1st OS address table I 402 stores an identifier 811 that identifies a device, a notification region address 812 that is used by a driver corresponding to a device identified by the identifier 811, a notification region size 813, a shared region address 814, and a shared region size 815. For instance, a row 810 shows that the notification region I 412 which is held by the driver I 401 and which corresponds to the device 102 identified by the identifier "02:00.1" is reserved from the address "128" having the size "64", and that the shared region I 411 is reserved from the address "512" having the size "1024". Note that at the time the 1st OS starts and a device is recognized to be connected to the 1st OS, one row is appropriately added in the 1st OS address table I 402.

The connected device table I 403 stores an identifier 821 of a device connected to the 1st OS 122, and a name 822 of the device identified by the identifier 821. For instance, a row 820 shows that the device 102, which is identified by the identifier "02:00.1" and whose name is identified by "Ethernet Controller", is connected to the 1st OS 122.

The device allocation table I 404 stores a name 831 of the virtual computer on which the 2nd OS 124 runs, and an identifier 832 that identifies a device to be allocated to a virtual computer identified by the name 831. For instance, a row 830 shows that a device identified by the identifier "02:00.1" is to be allocated to a virtual computer on which a 2nd OS identified by the name "Guest I" runs.

The controller information I 413 stores an identifier 841 that identifies a device to which the driver I 401, which retains the controller information I 413, corresponds. For instance, a row 840 shows that the driver I 401, which retains the controller information I 413, corresponds to a device identified by the identifier "02:00.1".

FIG. 22 illustrates the address conversion information B 511. The address conversion information B 511 contains a 1st OS address 2201 that is recognized by the 1st OS 122, a guest name 2202 that identifies the 2nd OS 124, which allocates a memory identified by the 1st OS address 2201, and a guest address 2203 that is a converted address of the 1st OS address 2201 recognized by the 2nd OS 124, which is identified by the guest name 2202. For instance, a row 2220 shows that a memory indicated by an address recognized as "8765" by the 1st OS 122 is recognized as a memory capable of being accessed at the address "0000" by the 2nd OS 124, which is identified by the name "Guest I".

By using the address conversion information B 511, address a1 of the shared region I, which is recognized by the 1st OS 122, and address a2 of the shared region II, which is recognized by the 2nd OS 124, can be converted. In addition, address b1 of the notification region I, which is recognized by the 1st OS 122, and address b2 of the notification region II, which is recognized by the 2nd OS 124, can be converted.

In this embodiment, by using the 1st OS name 782, the address conversion information B 511 has address conversion information of plural virtual computers in a table. By using plural pieces of the address conversion information B 511, each virtual computer may retain address conversion information without using the guest name 2202.

Figure 9:
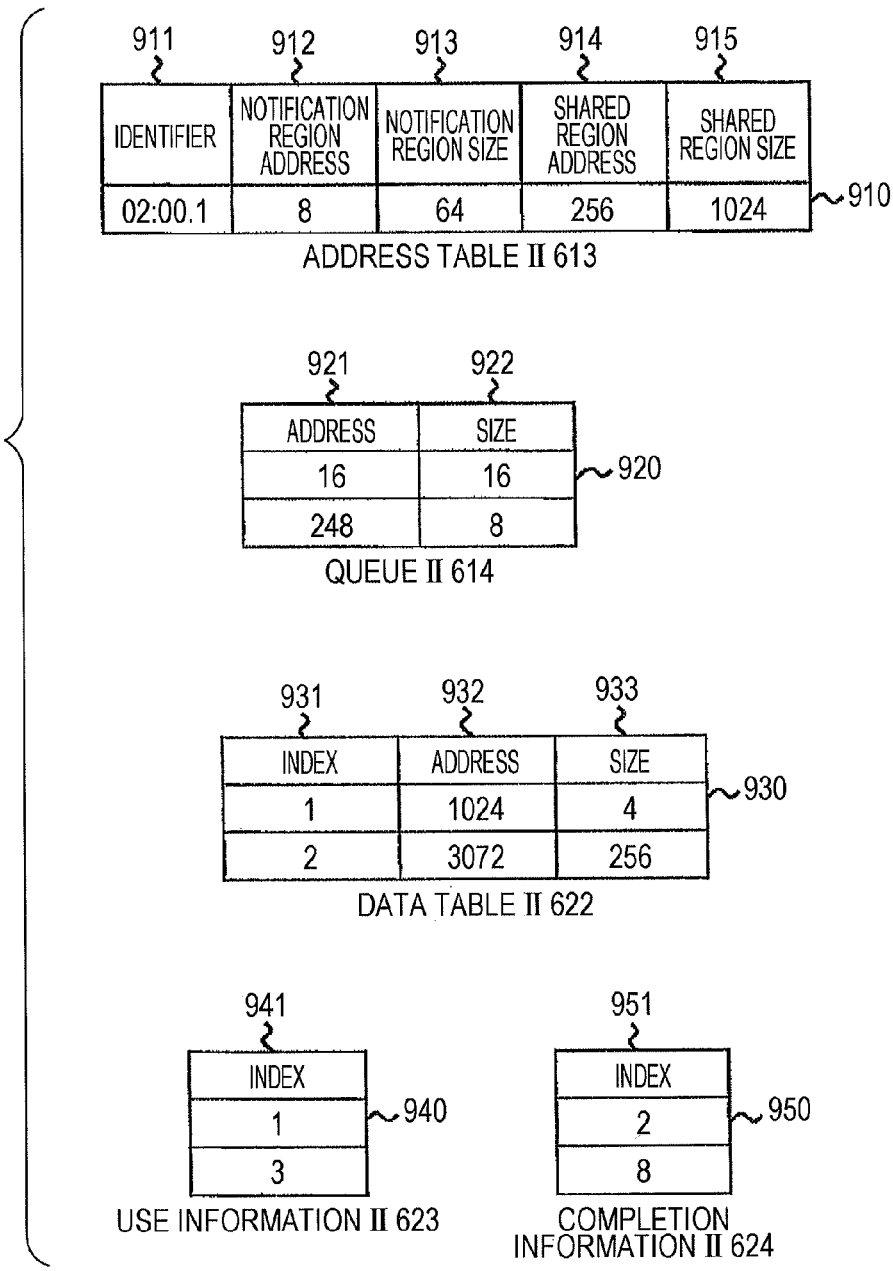
FIG. 9 illustrates examples of an address table II, queue II, a data table II, use information II, and completion information II.

FIG. 9 illustrates the address table II 613, the queue II 614, the data table II 622, the use information II 623, and the completion information II 624.

The address table II 613 stores an identifier 911 that identifies a device to which the driver II 601, which includes the address table II 613, corresponds, and a notification region address 912, a notification region size 913, a shared region address 914, and a shared region size 915 that identify the notification region II 604 and the shared region II 611, which are used by the driver II 601, which includes the address table II 613. For instance, a row 910 shows that the notification region II 604, which is held by the driver II 601, which corresponds to a device identified by the identifier "02:00.1", is reserved at address 8 having the size "64", and that the shared region II 611 is reserved at address 256 having the size "1024".

The queue II 614 stores an address 921 and size 922 of a region storing an unexecuted I/O request. For instance, a row 920 shows that an I/O request stored at address 16 having the size "16" of the virtual memory 203 in the 2nd OS 124 has not been executed yet.

The data table II 622, the use information II 623, and the completion information II 624 have information identical to the data table A 322, the use information A 323, and the completion information A 324.

Figure 10:
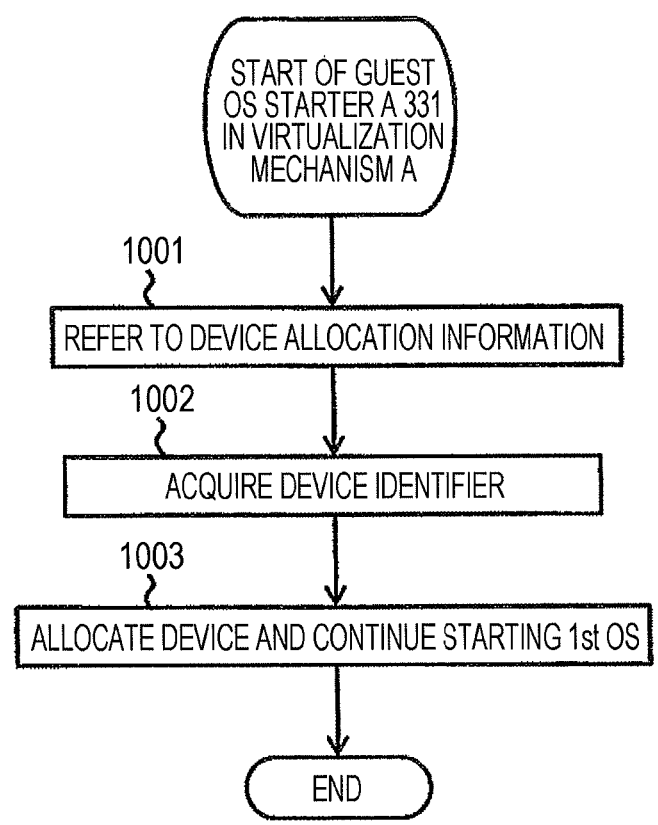
FIG. 10 is a flowchart of a 1st starting process that is executed by a guest OS generating mechanism.

FIG. 10 is a process flowchart of the guest OS starter A 331 included in the guest OS generating mechanism A 305 of the virtualization mechanism A 121.

In step 1001, the guest OS starter A 331 refers to the device allocation table A 302 when the 1st OS 122 starts.

In step 1002, the guest OS starter A 331 acquires, in the device allocation table A 302, the identifier 712 of a device which is stored in the row 710 including the name 711, which matches the name of the 1st OS 122, which started in step 1001.

In step 1003, the guest OS starter A 331 allocates a device identified by the identifier 712 of the device acquired in step 1002 to the 1st OS I, which has been started in step 1001, for example, the 1st OS 122, and continues to be started.

Figure 11:
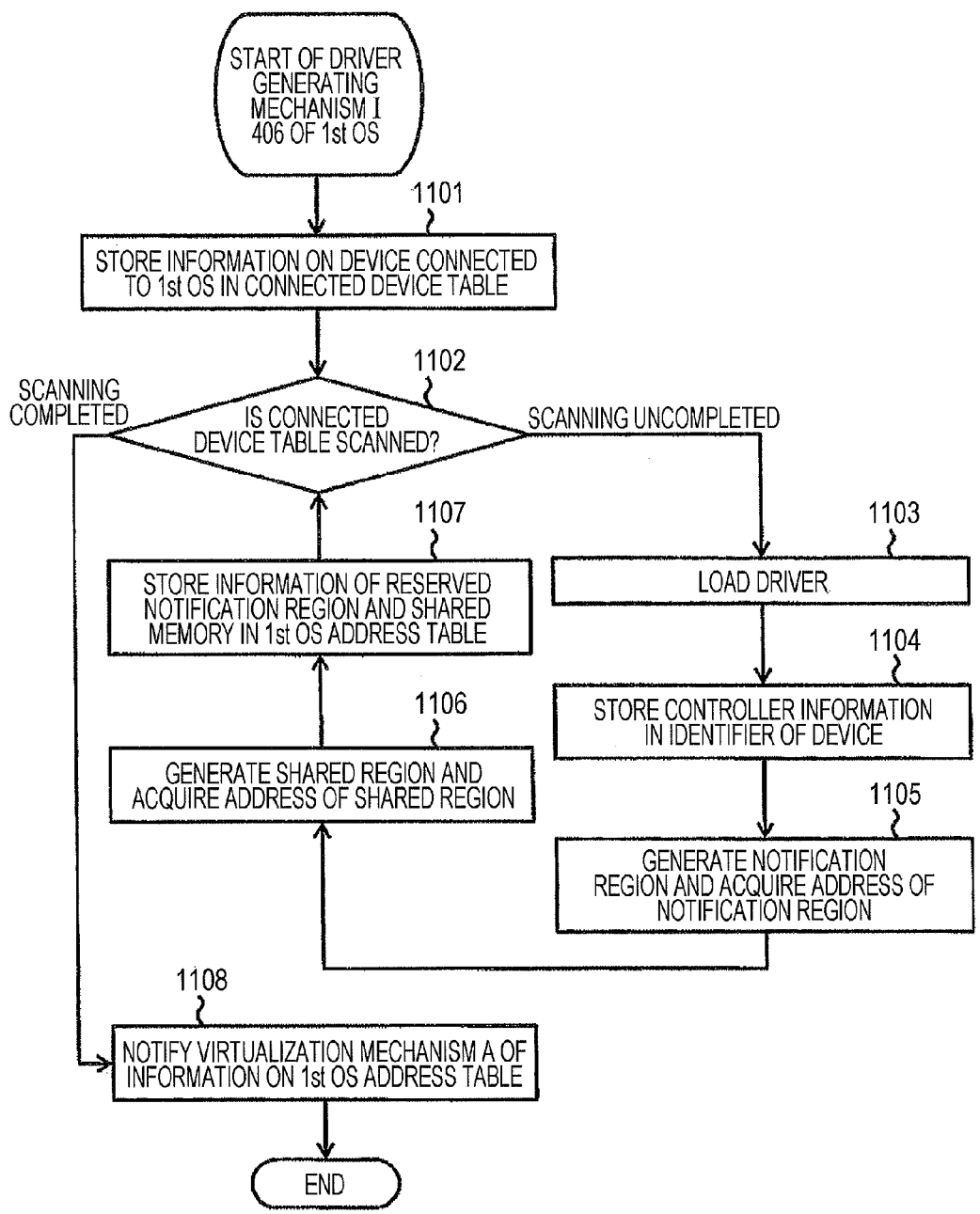
FIG. 11 is a flowchart of a 1st OS driver generating process that is executed by a driver generating mechanism.

FIG. 11 is a process flowchart of the driver generating mechanism I 406 of the 1st OS 122.

In step 1101, the self driver generator I 431 included in the driver generating mechanism I 406 acquires information, on the identifier 721 of the device, acquired in step 1002, and stores, in the connected device table I 403, the identifier 712 and a name that is information on the device identified by the identifier 712 recognized by the 1st OS 122, respectively as the identifier 821 and the name 822.

In step 1102, the self driver generator I 431 scans the connected device table I 403, in which the identifier 712 has been stored in step 1101, in order to generate a notification region and shared region of a device identified by the identifier 712.

In step 1103, if the connected device table I 403 includes an unscanned row, the self driver generator I 431 loads the self driver generator I 431, to which a device identified by the identifier 821 in unscanned row 820 corresponds.

In step 1104, the self driver generator I 431 stores, in the driver I 401 in the 1st OS 122, the controller information I 413, which stores the identifier 821 of the device to be allocated.

In step 1105, the self driver generator I 431 generates, in the driver I 401 in the 1st OS 122, the notification region I 412, which has a size stored in the notification region size I 417, and acquires address b1 of the generated a notification region I 412.

In step 1106, the self driver generator I 431 generates, in the driver I 401, the shared region I 411 by securing the size stored in the shared region size I 418 from a free region. The self driver generator I 431 also uses the start point of the generated a shared region I 411, as address a1, and acquires the address a1.

In step 1107, the self driver generator I 431 stores, in the 1st OS address table I 402, the identifier 821 of the device to be allocated, the address b1 acquired in step 1105 of the notification region I 412, the size of the notification region I 412 generated in step 1105, the address a1 acquired in step 1106 of the shared region I 411, and the size of the shared region I 411 generated in step 1106.

In step 1108, when scanning of all the rows is complete in step 1102, the notifier I 433 included in the driver generating mechanism I 406 of the 1st OS 122 notifies the virtualization mechanism A 121 of information on the 1st OS address table I 402.

Figure 12:
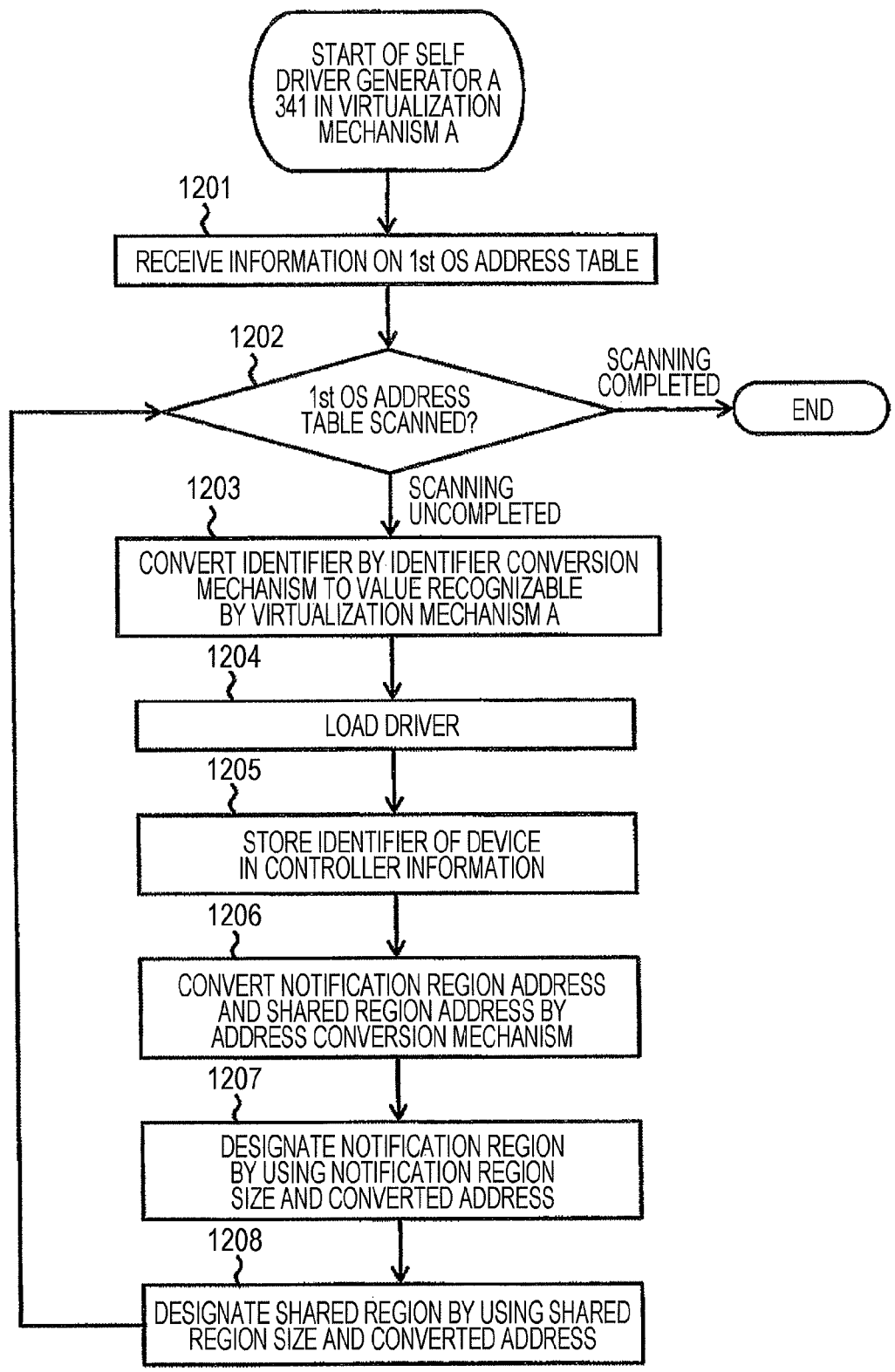
FIG. 12 is a flowchart of a virtualization mechanism A driver generating process that is executed by the driver generating mechanism.

FIG. 12 is a process flowchart of the driver generating mechanism A 306 of the virtualization mechanism A 121.

In step 1201, the self driver generator A 341 included in the driver generating mechanism A 306 of the virtualization mechanism A 121 receives and stores the information on the 1st OS address table I 402 notified in step 1108 in the physical memory 112.

In step 1202, the self driver generator A 341 scans the 1st OS address table I 402 received and stored in the physical memory 112 in step 1201 in order to load a driver corresponding to the device stored in the 1st OS address table I 402.

In step 1203, when the unscanned row 810 is included in the 1st OS address table I 402, the self driver generator A 341 acquires the identifier 811 of the device whose driver is to be loaded from the unscanned row 810. The identifier conversion mechanism A 304 converts an identifier 772 recognized by the 1st OS 122 to an identifier 771 recognizable by the virtualization mechanism A 121 by using the identifier conversion information A 351 for the acquired identifier 811.

In step 1204, the self driver generator A 341 loads, into the physical memory 112, the driver A 301, which corresponds to the device identified by the identifier 771 obtained by the conversion in step 1203.

In step 1205, the self driver generator A 341 stores, in the controller information A 315 of the driver A 301, the identifier 771 obtained by the conversion in step 1203 so as to have a value recognizable by the virtualization mechanism A 121.

In step 1206, the self driver generator A 341 acquires the notification region address 812 and the shared region address 814 from a row of the 1st OS address table I 402, in which the identifier 811 has been acquired in step 1203. The address conversion mechanism A 303 converts the notification region address 812 and the shared region address 814 so as to have a value recognizable by the virtualization mechanism A 121 from a value recognizable by the 1st OS 122 by using the address conversion information A 361.

In step 1207, the self driver generator A 341 stores, in the driver A 301, as the notification region A 312, a region designated by both the notification region size 813 acquired from the row of the 1st OS address table I 402, in which the identifier 811 has been acquired in step 1203, and the notification region address obtained in step 1206 by the conversion so as to have a value recognizable by the virtualization mechanism A 121 from a value recognizable by the 1st OS 122.

In step 1208, the self driver generator A 341 stores, in the driver A 301, as the shared region A 311, a region designated by both the shared region size 815, which is acquired from the row of the 1st OS address table I 402, in which the identifier 811 has been acquired in step 1203, and the shared region address obtained in step 1206 by the conversion so as to have a value recognizable by the virtualization mechanism A 121 from a value recognizable by the 1st OS 122.

After step 1208 has finished, the process returns to step 1202. When scanning of all the rows is complete in step 1202, the process is completed.

Figure 13:
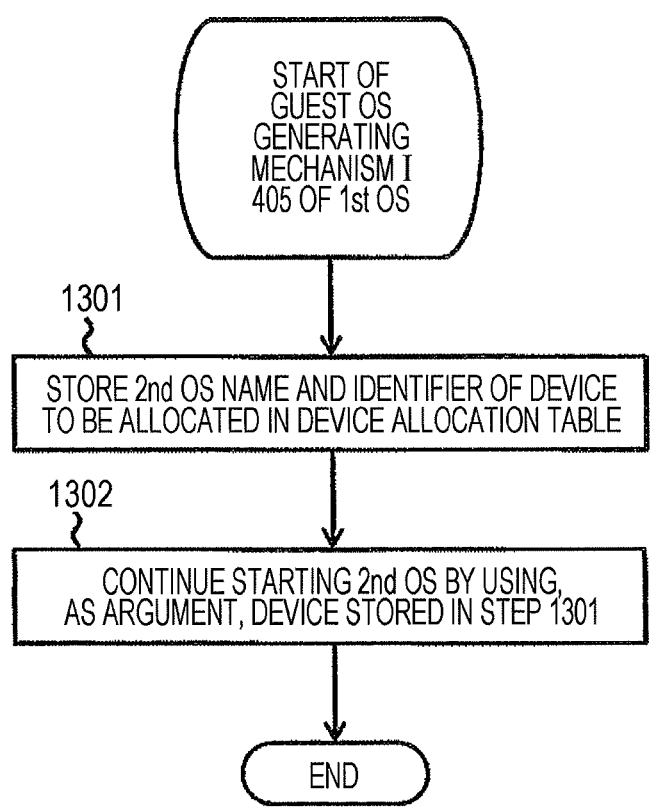
FIG. 13 is a flowchart of a 2nd-OS-driver starting process that is executed by the guest OS generating mechanism.

FIG. 13 is a process flowchart of the guest operating system (OS) generating mechanism I 405 of the 1st OS 122.

By starting the 2nd OS 124, to which the device identified by the identifier 821 in the row 820 stored in the connected device table I 403 is to be allocated, the guest driver allocator I 421 included in the guest operating system (OS) generating mechanism I 405 of the 1st OS 122 stores a name identifying the 2nd OS 124 in the device allocation table I 404.

In step 1301, the identifier 821 acquired from the connected device table I 403 is stored, as the identifier 832 of the device which is to be allocated to the 2nd OS 124, in the device allocation table I 404. Note that which of the rows of the connected device table I 403 is designated by, for example, the user.

In step 1302, the guest OS starter I 422 included in the guest operating system (OS) generating mechanism I 405 continues starting the 2nd OS 124 identified by the name 831 by using, as an argument, the identifier 821, stored in the device allocation table in step 1301, of the device which is to be allocated to the 2nd OS 124.

Figure 14:
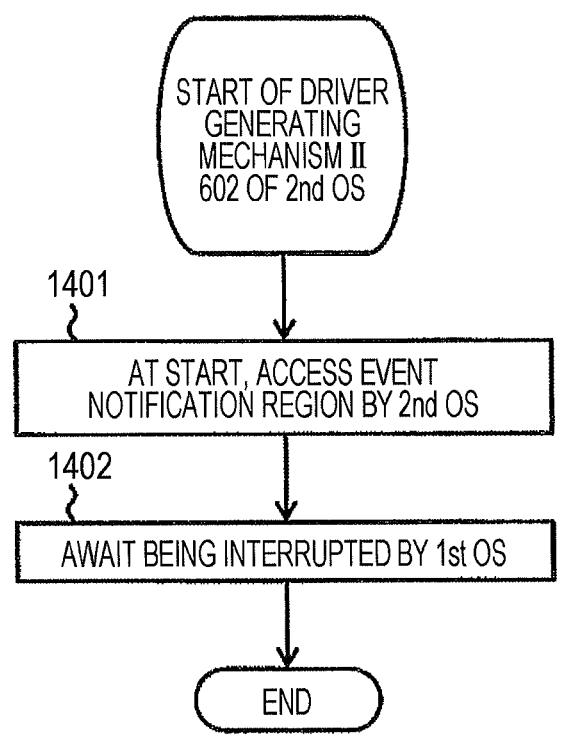
FIG. 14 is a flowchart of a 2nd-OS-driver generating process that is executed by the driver generating mechanism.

FIG. 14 is a process flowchart of the driver generating mechanism II 602 of the 2nd OS 124.

In step 1401, starting the 2nd OS 124 causes the driver generator II 631 included in the driver generating mechanism II 602 of the 2nd OS 124 to access the notification region II 604 in order to load the driver corresponding to the device allocated to the 2nd OS 124 in step 1302.

In step 1402, the driver generator II 631 awaits being interrupted by the 1st OS 122.

Figure 15:
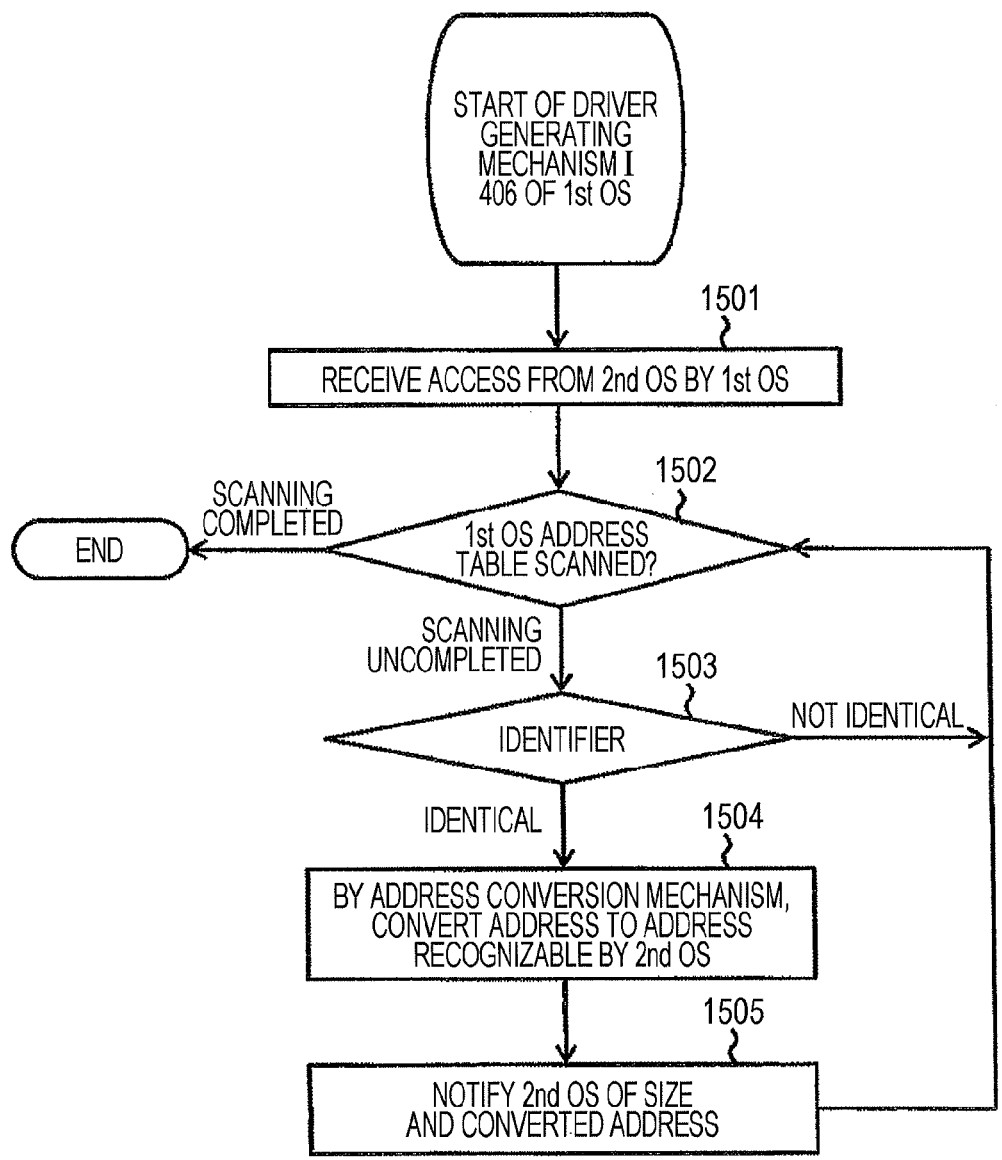
FIG. 15 is a flowchart of a 1st-OS-driver generating process that is executed by the driver generating mechanism.

FIG. 15 is a process flowchart of the driver generating mechanism I 406 of the 1st OS 122.

In step 1501, the guest driver generator I 432 of the driver generating mechanism I 406 in the 1st OS 122 receives access of the event notification region II 604 from the driver generator II 631 on the 2nd OS, which has occurred in step 1401. The event notification region I 407 is a region that starts at address c1 in the virtual memory 201 of the 1st OS 122 in FIG. 2. This region is identical to the event notification region II 604 that starts at address c2 in the virtual memory 203 of the 2nd OS.

In step 1502, the guest driver generator I 432 scans the 1st OS address table I 402 by using the identifier 841 stored in the controller information I 413 in order to acquire the addresses of the notification region I 412 and the shared region I 411.

In step 1503, when an unscanned row is included in the 1st OS address table I 402, the guest driver generator I 432 determines whether or not the identifier 841 stored in the controller information I 413 and the identifier 811 of the unscanned row 810 of the 1st OS address table I 402 are identical to each other.

When it is determined in step 1503 that both identifiers are not identical, the process returns to step 1502.

When it is determined in step 1503 that both identifiers are identical, the guest driver generator I 432 acquires the notification region address 812 and the shared region address 814 from the row 810 selected as determined in step 1503 to have the identifier 811, which is identical to the identifier 841. In addition, in step 1504, the guest driver generator I 432 converts a value, recognized by the 1st OS 122 to a value 2203 recognizable by the 2nd OS 124 by using the address conversion mechanism B 501 included in the virtualization mechanism B 123 to refer to the address conversion information B 511.

Here, the reason that the guest driver generator I 432 is able to use an address conversion mechanism in the virtualization mechanism B 123 and to refer to a table is described. As illustrated in FIG. 2, the memory of the virtualization mechanism B 123 is included in the memory of the 1st OS 122. Data in the virtualization mechanism B 123 is configured to be accessible by the 1st OS 122. Accordingly, each of various parts of the 1st OS 122, for example, the guest driver generator I 432 can access data in the virtualization mechanism B 123.

The notifier I 433 of the driver generating mechanism I 406 changes the notification region address 812 and the shared region address 814 in the 1st OS address table I 402 to the values converted in step 1504, and notifies the event notification region I 407 and the 2nd OS 124 of both addresses together with the notification region size I 417 and the shared region size I 418 by using the event notification region I 407. And the process returns to step 1502.

When scanning of all the rows is complete in step 1502, the process ends.

Figure 16:
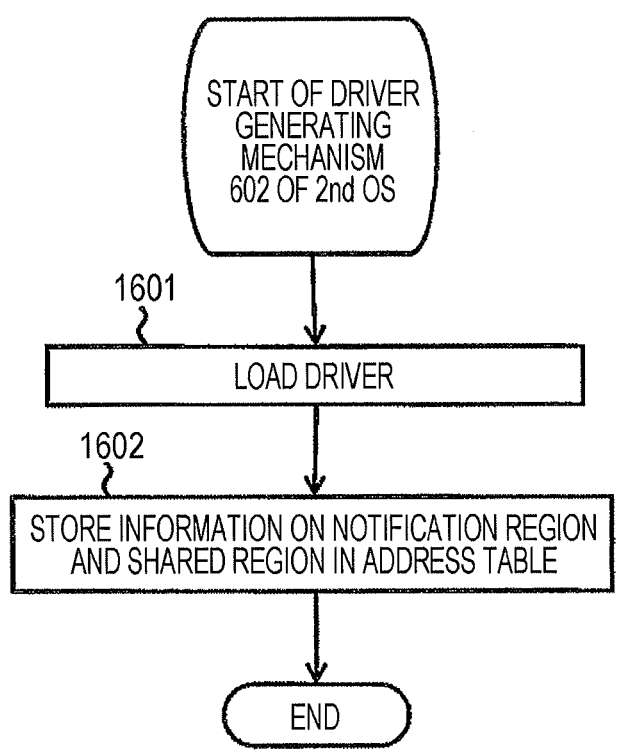
FIG. 16 is a flowchart of a 2nd-OS-driver generating process that is executed by the driver generating mechanism.

FIG. 16 is a process flowchart of the driver generator mechanism II 602 of the 2nd OS 124.

In step 1601, the driver generator II 631 included in the driver generating mechanism II 602 of the 2nd OS 124 receives the notification region address, notification region size, shared region address, and shared region size, notified by using the event notification region I 407 in step 1505, of the driver II 601, which corresponds to the device loaded by the guest driver generator I 432, which has accessed the event notification region II 604 in step 1401, and loads the driver II 601.

In step 1602, the driver generator II 631 stores the notification region address, notification region size, shared region address, and shared region size received in step 1601 in the address table II 613 in the driver II 601 of the 2nd OS 124.

The event notification region I 407 is a region that starts at address c1 in the virtual memory 201 of the 1st OS 122 in FIG. 2. This region is identical to the event notification region II 604 that starts at address c2 in the virtual memory 203 of the 2nd OS 124 in FIG. 2.

Figure 17:
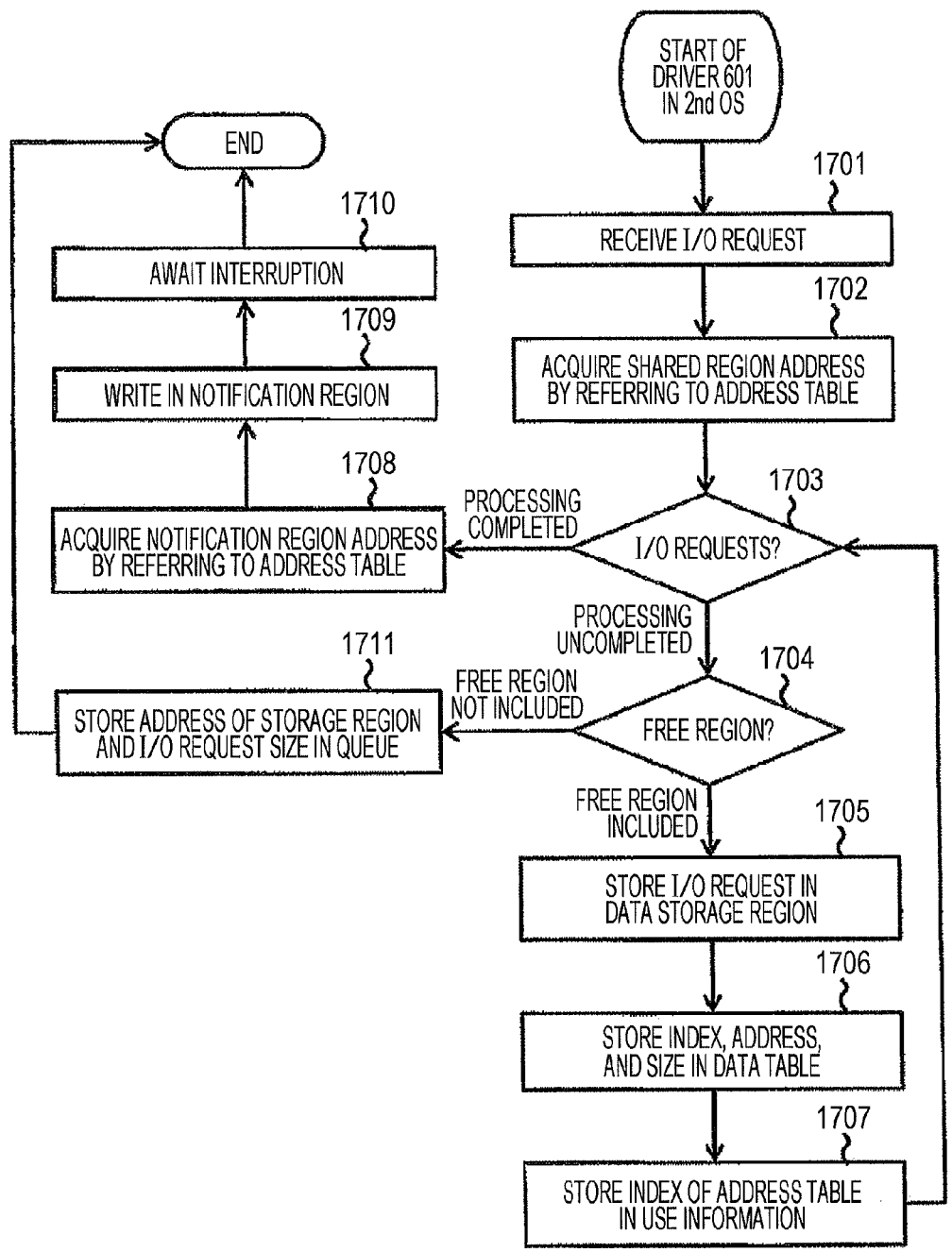
FIG. 17 is a flowchart of an I/O process that is executed by a 2nd OS driver.

FIG. 17 is a flowchart of the I/O process by the driver II 601 of the 2nd OS 124.

In step 1701, the I/O executor II 617 of the driver II 601 receives the I/O request executed by the application II 603 on the 2nd OS 124.

In step 1702, the I/O executor II 617 acquires the shared region address 914 by referring to the address table II 613, in which the plural pieces of information have been stored in step 1601.

In step 1703, the I/O executor II 617 determines whether or not processing for all the I/O requests received in step 1701 is complete. If an unscanned I/O request remains, the process proceeds to step 1704. If no unscanned I/O request remains, that is, if the processing for all the I/O requests is complete, the process proceeds to step 1708.

In step 1704, the I/O executor II 617 confirms whether or not the data storage region 621 of the driver II 601 includes a free region.

In step 1705, if it is confirmed in step 1704 that the data storage region 621 of the driver II 601 includes a free region, the I/O executor II 617 stores, in the free region confirmed in step 1704 of the data storage region 621, the I/O request determined to be unscanned in step 1703.

In step 1706, the I/O executor II 617 stores, in the data table II 622 in the driver II 601, the index unused in the data table II 622 which has been acquired by determining the indexes of all the rows in the data table II 622, an address in the data storage region 621, in which the I/O request has been stored in step 1705, and a data size of the I/O request stored in the data storage region 621.

In step 1707, the I/O executor II 617 stores, in the use information II 623 of the driver II 601, the index stored in step 1706 of the data table II 622. After completion of step 1707, the process returns to step 1703.

In step 1708, if the processing for all the I/O requests received by the driver II 601 is complete in step 1703, the I/O executor II 617 acquires the notification region address 912 by referring to the address table II 613 in the driver II 601.

After step 1708, in step 1709, the I/O executor II 617 changes the value stored in the notification region II 612 from 0 to 1 in order to notify the 1st OS 122 that the I/O executor II 617 will issue an I/O request. Step 1709 causes the driver II 601 to be regarded as having issued the I/O request to the device identified by the 2nd OS 124.

In step 1710, the I/O executor II 617 awaits an interruption that notifies it of completion of the I/O request issued in step 1709 for the device identified by the 2nd OS 124.

In step 1711, if it is confirmed in step 1704 that the data storage region 621 includes no free region, the I/O executor II 617 stores the acquired I/O request in the temporary storage region II 615, and stores an address representing a storage location of, the temporary storage region II 615 and the size of the stored I/O request in the queue II 614. Then, the process ends.

Note that when the I/O is asynchronously implemented, at the time the driver II 601 has received the I/O request in step 1701, the application II 603 may be notified of I/O completion. In this case, the driver II 601 continues step 1702 and the subsequent steps without being in synchronization with the application II 603.

Figure 18:
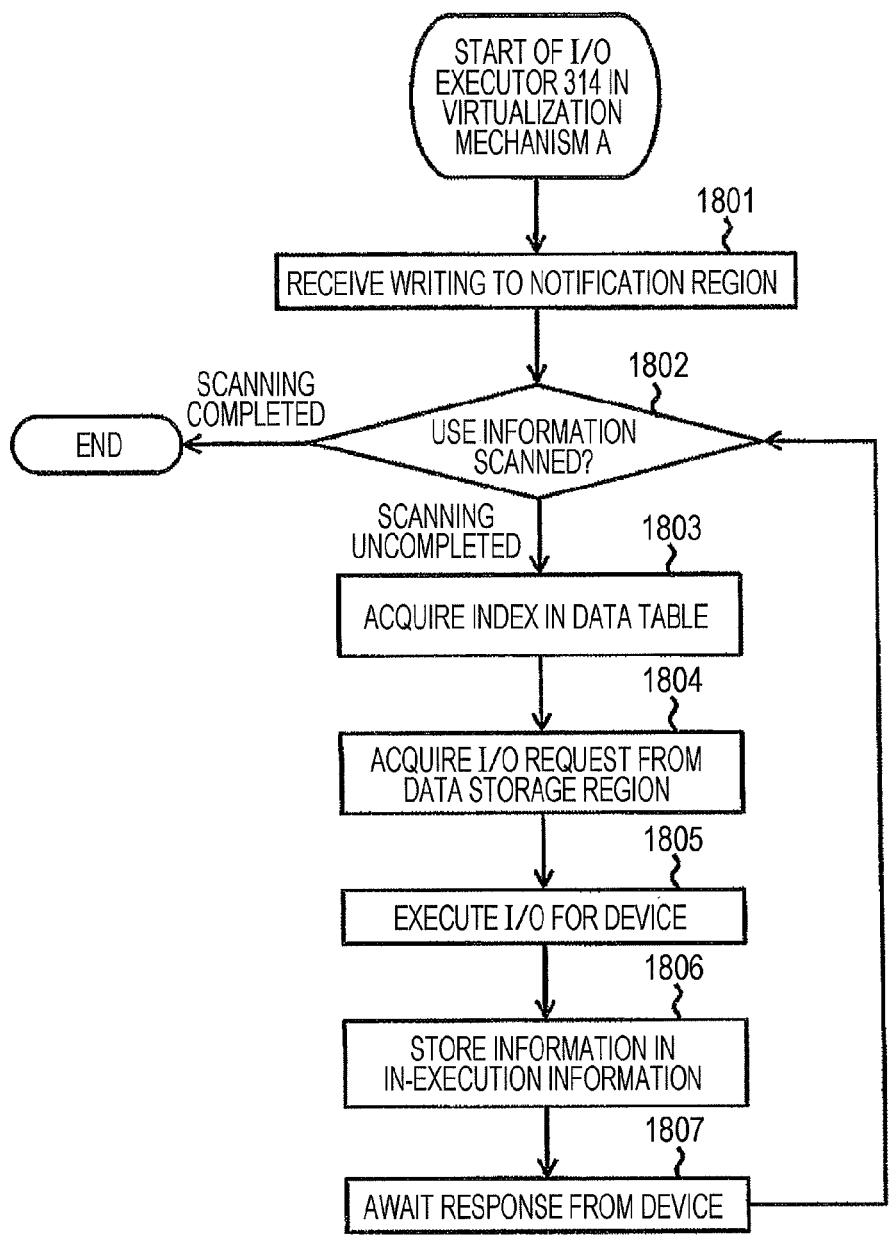
FIG. 18 is a flowchart of an I/O process that is executed by a driver of the virtualization mechanism A.

FIG. 18 is a process flowchart of the I/O executor A 314 of the virtualization mechanism A 121.

In step 1801, the I/O executor A 314 receives the storing, executed in step 1709, to the notification region A 312. The value stored in the notification region A 312 is returned to 0. The notification region II 612 is a region that starts at address b2 in the virtual memory 203 of the 2nd OS 124 in FIG. 2. This region is identical to the notification region A 312 that starts at address b0 in the physical memory 112 in FIG. 2.

In step 1802, the I/O executor A 314, which has received the storing to the notification region A 312, scans the use information A 323 in the driver A 301 in order to confirm whether or not an I/O request to be executed for the device 102 has been issued.

In step 1803, if an unscanned index 751 is included in the use information A 323, the I/O executor A 314 acquires the unscanned index.

In step 1804, the I/O executor A 314 identifies a row in which the index of the data table A 322 identical to the unscanned index 751 acquired in step 1803, acquires the address 742 and size 743 of the data storage region A 321, stored in the identified row, and acquires the I/O request stored in the data storage region A 321 by using the acquired address 742 and size 743. The data storage region II 621 and the data storage region A 321 represent the same region.

In step 1805, the I/O executor A 314 executes the I/O acquired in step 1804 on the device 102 identified by the controller information A 315 updated in step 1205.

In step 1806, the I/O executor A 314 stores, in the in-execution information A 316, the index 741 stored in the row of the data table A 322 in which the information on the I/O executed in step 1805 is stored, and a destination address of the I/O executed in step 1805.

In step 1807, the I/O executor A 314 awaits a response from the device for the I/O request executed in step 1806. The process returns to step 1802.

When the use information A 323 includes no unscanned index 751, scanning of the use information A 323 is regarded as complete, and the process ends.

Figure 19:
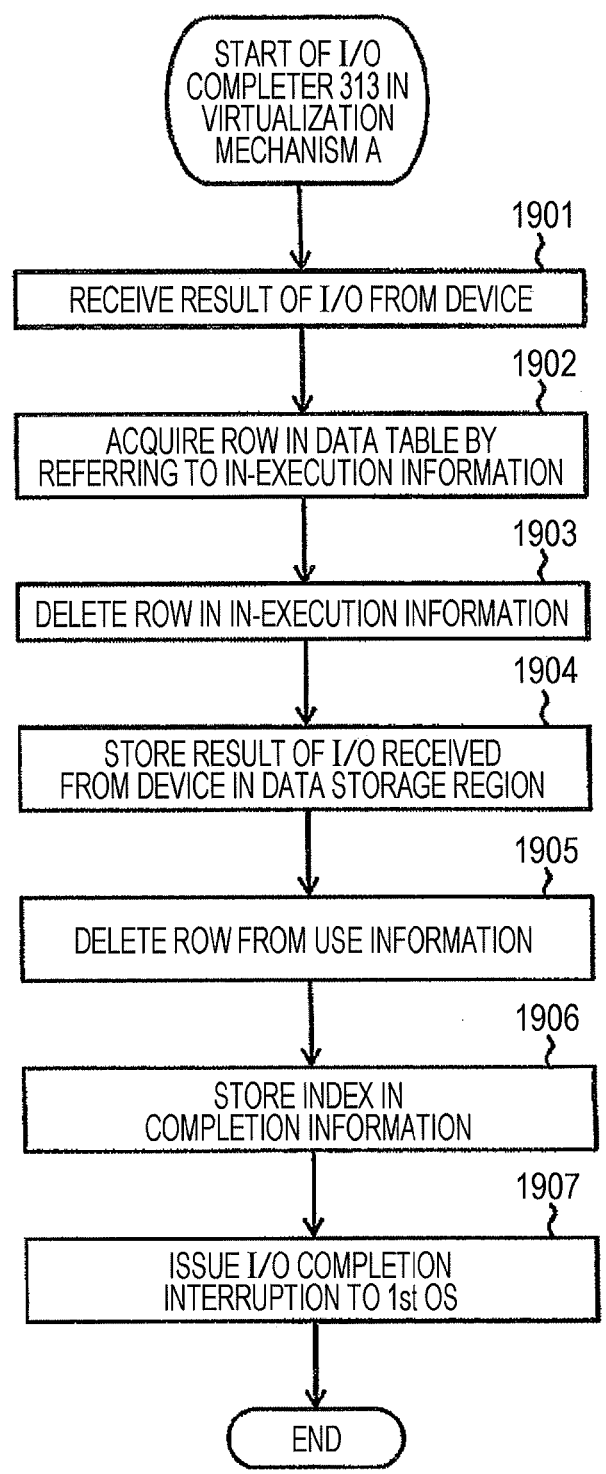
FIG. 19 is a flowchart of an I/O completion process that is executed by a driver for the virtualization mechanism A driver.

FIG. 19 is a process flowchart of the I/O completer A 313 of the virtualization mechanism A 121.

In step 1901, the I/O completer A 313 receives the result of the I/O executed in step 1805 from the device 102.

In step 1902, the I/O completer A 313 identifies, in the in-execution information A 316, the row 730 in which the address 732 is identical to the destination address of the I/O received in step 1901, and acquires the index 731 from the row 730. In addition, the I/O completer A 313 acquires, in the data table A 322, a row 740 in which the index 741 is identical to the acquired index 731.

In step 1903, the I/O completer A 313 deletes the row 730, identified in step 1902, of the in-execution information A 316.

In step 1904, the I/O completer A 313 stores the result of the I/O received from the device in step 1901 in the data storage region A 321 identified by the address 742 and size 743 stored in the row 740 acquired in step 1902 of the data table A 322.

In step 1905, the I/O completer A 313 deletes, from the use information A 323, the row 750 in which the index, acquired in step 1901, having a value identical to that of the index 731, is stored.

In step 1906, the I/O completer A 313 stores, as the index 761, the index 731 acquired in step 1901 in the completion information A 324.

In step 1907, the I/O completer A 313 acquires the identifier 721 from the controller information A 315, and identifies the row 710, in which the identifier 721 and the identifier 712 of the device allocation table A 302 are identical to each other. The I/O completer A 313 also identifies the 1st OS 122 on the basis of the name 711 stored in the row 710, and issues an I/O completion interruption.

Figure 20:
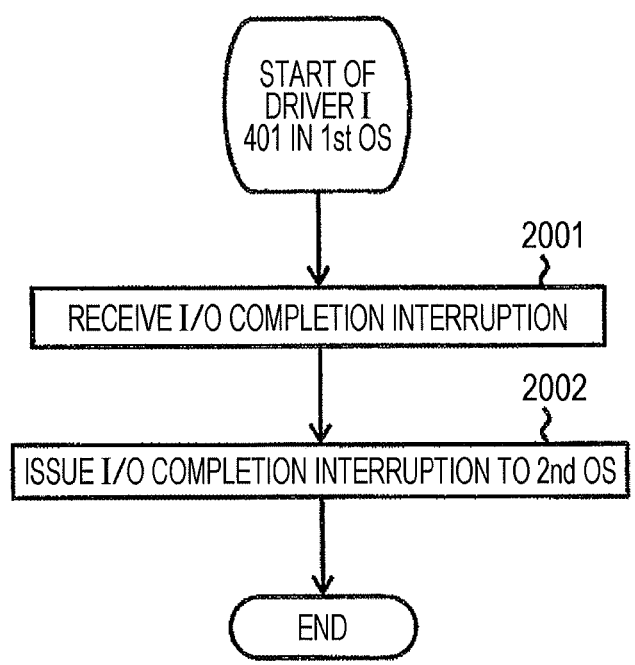
FIG. 20 is a flowchart of an I/O completion process that is executed by the 1st OS driver.

FIG. 20 is a process flowchart of the driver I 401 of the 1st OS 122.

In step 2001, the interruption receiver I 414 of the driver I 410 in the 1st OS 122 receives the I/O completion interruption issued in step 1907.

In step 2002, the interruption receiver I 414 acquires the identifier 841 from the controller information I 413, identifies the 2nd OS 124, to which the device identified by the identifier 841 is allocated, by referring to the device allocation table I 404, and issues the I/O completion interruption to the identified 2nd OS 124.

Figure 21:
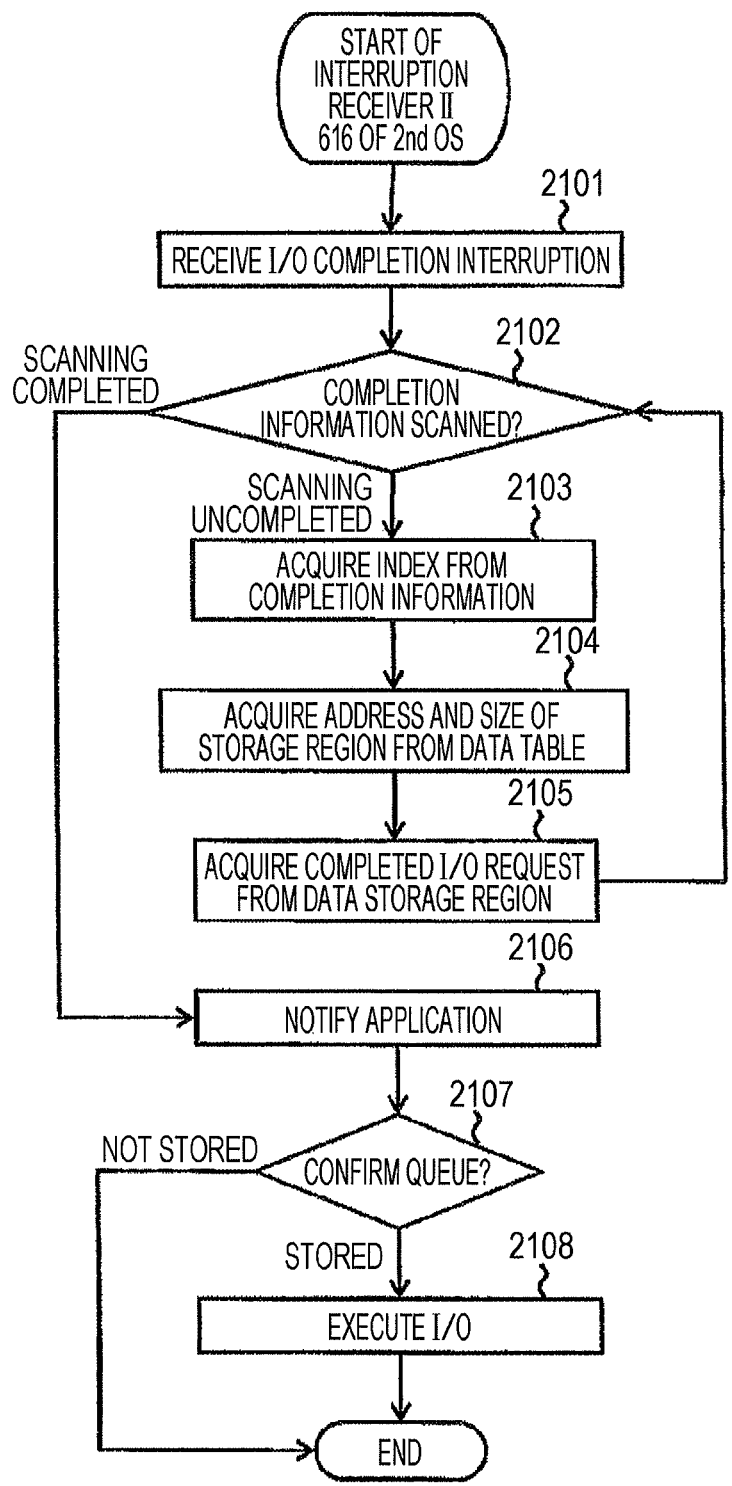
FIG. 21 is a flowchart of an I/O completion process that is executed by the 2nd OS driver.

FIG. 21 is a flowchart illustrating an I/O receiving process of the 2nd OS 124 by the interruption receiver II 616 of the 2nd OS 124.

In step 2101, the interruption receiver II 616 receives the I/O completion interruption issued in step 2002.

In step 2102, the interruption receiver II 616 scans the completion information II 624 updated in step 1906. The completion information A 324 and the completion information II 624 represent the same information.

In step 2103, when an unscanned index 951 is included in the completion information II 624, the interruption receiver II 616 acquires the unscanned index 951.

In step 2104, the interruption receiver II 616 acquires the address 932 and size 933 of the data storage region II 621 from a row 930 of the data table II 622, which has an index 931 identical to the index 951 acquired in step 2103.

In step 2105, the interruption receiver II 616 acquires the completed I/O request from the data storage region 621 identified by the address and size acquired in step 2014.

After step 2105 finishes, the process returns to step 2102.

In step 2106, after scanning of the completion information II 624 in step 2102 finishes, the interruption receiver II 616 notifies the application II 603 of completion of the I/O.

In step 2107, after step 2106 finishes, the interruption receiver II 616 confirms the queue II 614.

In step 2108, when the I/O request is stored in the queue II 614, the interruption receiver II 616 acquires the stored I/O request, deletes the I/O request acquired from the queue II 614, and executes step 1703 and the subsequent steps by using the acquired I/O request as an argument and calling the I/O executor II 617.

When the I/O request is not stored in the I/O executor II 617, the I/O receiving process of the 2nd OS 124 is completed.

What is claimed is:

1. A virtual computer system comprising:
a physical computer including a central processing unit and a physical memory;
a first virtualization mechanism that operates on the physical computer to provide a first virtual computer;
a second virtualization mechanism that operates on the first virtual computer to provide a second virtual computer; and
a device connected to the physical computer,
wherein a driver generating mechanism I included in the first virtual computer loads a driver I allocated to the first virtual computer into a first virtual memory allocated to the first virtual computer,
the driver generating mechanism I stores, as controller information, an identifier of the device which is allocated to the first virtual computer,
the driver generating mechanism I generates a shared region I in a region of the first virtual memory into which the driver I is loaded,
the driver generating mechanism I stores an identifier of the device which is allocated to the first virtual computer and an address of the shared region I in address management information correspondingly to the driver I,
the driver generating mechanism I transmits the address management information to the first virtualization mechanism,
a driver generating mechanism A included in the first virtualization mechanism acquires an identifier of the device which is allocated to the first virtual computer by referring to the address management information received from the driver generating mechanism I,
the driver generating mechanism A converts the identifier of the device which is allocated to the first virtual computer to an identifier of the device which is recognizable by the first virtualization mechanism,
the driver generating mechanism A loads, into the physical memory, a driver A of the device which corresponds to the identifier of the device which is recognizable by the first virtualization mechanism,
the driver generating mechanism A acquires an address of the shared region I which corresponds to the identifier of the device, to which the first virtual computer is allocated,
the driver generating mechanism A converts the acquired address of the shared region I to an address of a shared region A which is recognizable by the first virtualization mechanism,
the driver generating mechanism A generates a shared region A whose address has been converted to an address recognizable by the first virtualization mechanism, in a region of the physical memory in which the driver A is loaded,
the driver generating mechanism I searches for the address management information by using the identifier stored in the controller information,
when an identifier included in the address management information and the identifier stored in the controller information are identical to each other, the driver generating mechanism I acquires an address of the shared region I which corresponds to the identical identifiers,
the driver generating mechanism I converts the acquired address of the shared region I to an address of a shared region II which is recognizable by the second virtual computer,
the driver generating mechanism I transmits the converted address of the shared region II to the second virtual computer,
the second virtual computer uses, as a driver II of the second virtual computer, a driver of the device, which corresponds to an interruption received from the first virtual computer,
the second virtual computer stores, in the driver II, the address of the shared region II which is received from the driver generating mechanism I,
a driver II of the second virtual computer receives an I/O executing request of the second virtual computer, the driver II of the second virtual computer stores the received I/O executing request in the shared region II, the first virtualization mechanism refers to the shared region A, which corresponds to the shared region II, by storing the I/O executing request in the shared region II, the first virtualization mechanism executes the I/O executing request for the device which is allocated to the first virtual computer, the first virtualization mechanism transmits completion of executing the I/O executing request to the driver I, the driver I of the first virtual computer transmits the completion of executing the I/O executing request received from the first virtual computer to the driver II, and the driver II of the second virtual computer receives the completion of executing the I/O executing request from the driver I.

2. The virtual computer system according to claim 1, wherein the second virtual computer recognizes the driver I of the device which is allocated to the first virtual computer.

3. The virtual computer system according to claim 2, wherein the shared region I, the shared region II, and the shared region A each are operable by the first virtualization mechanism and the second virtualization mechanism.

4. The virtual computer system according to claim 3, wherein the first virtual computer and the second virtual computer each have a multistage configuration.

* * * * *